(12) United States Patent
Mandich et al.

(10) Patent No.: US 10,412,063 B1
(45) Date of Patent: Sep. 10, 2019

(54) END-TO-END DOUBLE-RATCHET ENCRYPTION WITH EPOCH KEY EXCHANGE

(71) Applicant: QRYPT, INC., New York, NY (US)

(72) Inventors: Denis Mandich, New York, NY (US); Yevgeniy Dodis, New York, NY (US)

(73) Assignee: QRYPT, INC., New York, NY (US)

( * ) Notice: Subject to any disclaimer, the term of this patent is extended or adjusted under 35 U.S.C. 154(b) by 0 days.

(21) Appl. No.: 16/267,819

(22) Filed: Feb. 5, 2019

(51) Int. Cl.
  *H04L 29/06* (2006.01)
  *H04L 9/08* (2006.01)
  *H04L 9/32* (2006.01)
  *G06F 7/58* (2006.01)

(52) U.S. Cl.
  CPC .......... *H04L 63/045* (2013.01); *H04L 9/0869* (2013.01); *H04L 9/0891* (2013.01); *H04L 9/3226* (2013.01); *H04L 63/0442* (2013.01); *G06F 7/588* (2013.01)

(58) Field of Classification Search
  CPC . H04L 9/08–0891; H04L 9/3226–3231; H04L 63/0428–0457; H04L 63/06; H04L 63/061; H04L 63/068
  See application file for complete search history.

(56) References Cited

U.S. PATENT DOCUMENTS

| | | | |
|---|---|---|---|
| 4,731,840 A | 3/1988 | Mniszewski et al. | |
| 5,737,419 A | 4/1998 | Ganesan | |
| 5,748,735 A | 5/1998 | Ganesan | |
| 6,694,025 B1 | 2/2004 | Epstein et al. | |
| 9,698,976 B1 | 7/2017 | Statica et al. | |
| 9,929,863 B2 | 3/2018 | Freudiger et al. | |
| 10,116,637 B1 | 10/2018 | Kasabwala et al. | |
| 10,129,223 B1 | 11/2018 | Bhattacharyya et al. | |
| 10,142,300 B1 | 11/2018 | Leavy et al. | |
| 2004/0146015 A1 | 7/2004 | Cross et al. | |
| 2009/0217035 A1 | 8/2009 | Khan | |
| 2013/0028419 A1 | 1/2013 | Das et al. | |
| 2018/0063094 A1 | 3/2018 | Albrecht | |
| 2018/0076964 A1 | 3/2018 | O'Connor et al. | |
| 2018/0176157 A1 | 6/2018 | Kret et al. | |
| 2018/0212771 A1 | 7/2018 | Howell et al. | |
| 2018/0241707 A1 | 8/2018 | Sarafa et al. | |
| 2018/0241725 A1 | 8/2018 | Konigsberg et al. | |
| 2018/0241871 A1* | 8/2018 | Sarafa | H04M 1/72552 |

* cited by examiner

*Primary Examiner* — Kevin Bechtel
(74) *Attorney, Agent, or Firm* — Troutman Sanders LLP

(57) ABSTRACT

Systems, devices, and methods are disclosed for instantaneously decrypting data in an end-to-end encrypted secure messaging session while maintaining forward secrecy and post-compromise security using a double ratchet communication protocol. Unique message keys can be generated in a predictable progression independently on each device, ratcheting keys for each message on an as-needed basis, and a seed key and state for the predictable progression can be updated based on an asymmetric key exchange between the devices, thereby serving as a second ratchet. Message keys can feed a pseudo-random number generator (PRG) to generate the next message key in a progression. A Continuous Key Agreement (CKA) engine can use an asymmetric key pair to generate a shared secret key to feed a Pseudo-Random Function (PRF-PRNG) to reset the state of the PRG and provide a refresh key to the PRG.

19 Claims, 18 Drawing Sheets

END-TO-END DOUBLE-RATCHET ENCRYPTION WITH EPOCH KEY EXCHANGE

FIELD OF INVENTION

The present invention generally relates to electronic device communications, and more particularly, to end-to-end encryption.

BACKGROUND

Communications security on a computer network requires the generation, distribution, storage, and management of cryptographic keys. Transmitted information can include text messages, files, voice, video and other formats. (For the purposes here, messaging will be defined as data encrypted and delivered in any format.) Messages are generally stored in an encrypted state prior to transmission, and operations can be performed on already encrypted data. End-to-end encryption is generally characterized by communicating parties being the only users capable of decrypting messages. End-to-end encryption can prevent intermediaries and third parties used to facilitate the communications from eavesdropping and can facilitate secure communications even on compromised networks.

Secure Messaging (SM) has become the primary means of communication among billions of people worldwide, but the term lacks universally accepted formal definitions and proofs with a few exceptions. The Axolotl Ratchet aka the Double Ratchet Algorithm is modeled on the Diffie-Hellman asymmetric ratchet in the Off-the-Record (OTR) messaging system and symmetric key ratchets used by the Silent Circle messaging protocol, resulting in the currently ubiquitous Signal Protocol. Encrypting and authenticating every message with a new symmetric key is the foundation of many modern end-to-end encrypted messaging products in commercial use.

While there are a limited number of security proofs of specific implementations, there are none for the generalized protocol nor are any provably secure against brute force attack by quantum computers. Specifically, a Diffie Hellman algorithm (currently used in the Signal Protocol for asymmetric ratcheting) is generally more vulnerable compared to post-quantum cryptography like lattice or code-based algorithms. While some existing ratcheting protocols achieve desirable properties like forward secrecy and post-compromise security, formal proofs of Signal-like protocols sacrifice immediate decryption and have limited or no message loss retrieval (MLR) functionality.

There is therefore a need for improved methods, devices, and systems for improved end-to-end message encryption.

SUMMARY

It is an object of the present invention to provide systems, devices, and methods to automatically and instantaneously decrypt data in an end-to-end encrypted secure messaging session while maintaining forward secrecy and post-compromise security. Generally, example communication devices presented herein can each include a pseudo-random number generator (PRG) to generate a sequence of message keys, a Continuous Key Agreement (CKA) engine, a Pseudo-Random Function (PRF-PRNG) fed by the CKA to reset the state of the PRG and provide a refresh key to the PRG. Each communication device in a communication session can utilize the Continuous Key Agreement (CKA) to independently generate the symmetric key on each device, provide the symmetric key and a previous state of the PRG to the PRF-PRNG, generate an updated state and the refresh key with the PRF-PRNG based on the symmetric key and the previous state, initialize the PRG with the state, provide the root key to the PRG to generate a first message key, recursively feeding each message key into the PRG to generate the subsequent message key and a sequence of message keys for a given one-way communication epoch, and when the direction of message transmission changes such that a receiving device becomes a sending device, generating a new symmetric key via the CKA to thereby generate a new sequence of message keys using the PRF-PRNG and the PRG in a similar manner as was used to generate the message keys for the first epoch, the new sequence of message keys being the message keys for a second one-way communication epoch.

Another object of the invention is to provide a protocol in which messages can be received out of order from the sender but can nevertheless be immediately decrypted and properly ordered in the messaging queue by the receiver. Cryptographic ratchets can be used to maintain liveness even when some messages are permanently lost. Each message can include a header that can be used by the receiving device to verify the authenticity of the message and/or to determine the order in which the message was sent from the sending device.

An example method of exchanging messages between devices can include one or more of the following steps presented in no particular order, and the method can include additional steps not included here. Two communication devices, "Device A" and "Device B", can be provided that are capable of transmitting data to each other via an end-to-end encryption protocol. Data structures can be provided to facilitate the end-to-end encryption including a root state and a first asymmetric key pair having a first public key and a first private key. The root state can be stored on both Device A and Device B, the first public key can be stored on Device A, and the first private key can be stored on Device B. A first epoch key can be generated on Device A based on the first public key, and Device A can also generate a second asymmetric key pair having a second private key and a second public key. The first epoch key and the second public key can be transmitted by Device A and received by Device B. Each of Device A and B can independently generate a first refresh key and a first state. On Device A, the first refresh key and the first state can each be generated based on the first public key and the root state. On Device B, the first refresh key and the first state can each be generated based on the first private key, the first epoch key, and the root state. Each of Device A and B can independently generate a first message key such that on each device the first message key is based on the first state and the first refresh key.

With the first message key in hand on Device A, Device A can begin sending encrypted messages to Device B. Device A can encrypt a first message with the first message key and transmit the encrypted first message to Device B. Device B can receive the first message key and decrypt it using the first message key, having previously generated the first message key or having generated the first message key upon receipt of the first message.

A second message key can be generated independently on each of Device A and Device B, the second message key generated based on the first state and the first message key. With the second message key in hand on Device A, Device A can send a second encrypted message to Device B. Device A can encrypt the second message with the second message key and transmit the second encrypted message to Device B. Device B can receive the second encrypted message and decrypt it with the second message key, having previously generated the second message key or having generated the second message key upon receipt of the second message.

When Device B begins to respond to Device A, the first state can be updated to a second state and the first refresh key can be updated to a second refresh key to generate a new series of message keys. Device B can generate a second epoch key based on the second public key previously generated and transmitted by Device A. Device B can also generate a third asymmetric key pair having a third private key and a third public key. The second epoch key and the third public key can be transmitted by Device B and received by Device A. Device A and Device B can independently generate the second refresh key and the second state on each device. On Device B, the second refresh key and the second state can each be generated based on the second public key and the first state previously generated on Device B. On Device A, the second refresh key and the second state can each be generated based on the second private key previously generated on Device A, the second epoch key received from Device B, and the first state previously generated on Device A. With the second state and second refresh key in hand on each device, Device A and B can independently generate a third and a fourth message key in a similar manner as the first and second message keys were generated as described above.

Further, before Device B transmits the second epoch key and the first public key to Device A, the first message key and/or second message key can be deleted from Device B.

Referring to the first message transmitted by Device A, Device A can generate a first ciphertext including a header, and the first ciphertext can be transmitted to Device B. The header can be used by Device B to verify that the first message key is the appropriate message key to decrypt the first ciphertext. The header can be generated by Device A to include a first message index associated with the first message key and a first epoch index associated with the first state. Device B can verify the first message key based on the first message index and the first epoch index.

Additionally, or alternatively, Device A can generate the first header to include the first epoch key and second public key, and the first epoch key and the second public key can be transmitted to Device B in the first header of the first ciphertext.

Referring to the generation of the first message key on each of Device A and Device B, a first shared key can be generated independently on each device as an intermediary step performed before generating the first message key. On each of Device A and Device B, the first refresh key and the first state can be generated based on the first shared key and the root state. On Device A, the first shared key can be generated based on the first public key, and on Device B, the first shared key can be generated based on the first private key and the first epoch key.

Each of Device A and Device B can have a respective pseudo-random function. Independently on each device, the first shared key and the root key can be provided as inputs to the pseudo-random function, and the first state and the first refresh keys can be generated at outputs of the pseudo-random function.

Referring to the root state stored on Device A and Device B, the root state can be generated independently on each device based on a root key received by each device. Independently on each of Device A and Device B, the root key can be provided to the respective pseudo-random function and the root state can be generated as an output from each respective pseudo-random function.

Device A and Device B can each have a respective random number generator that can be used to generate sequences of message keys for each epoch. Referring to the generation of the first and second message keys, the random number generator can be used on each device to independently generate the first message key and the second message key. On each of Device A and Device B, the respective random number generator can be initialized with the first state, and the first refresh key can be provided as an input to the random number generator. The first message key can be generated by the random number generator initialized in the first state and based on the first refresh key. The first message key can be provided as an input to the random number generator initialized with the first state to produce the second message key.

Alternatively, each respective random number generator and respective pseudo-random function can be used to generate a sequence of message keys for each epoch. On each device, the first message key can be generated like as described above. The second message key can be generated not based on the first message key, but instead by providing the first state as an input to the pseudo-random function, generating a second state as an output to the pseudo-random function, initializing the random number generator with the second state, and generating the second message with the random number generator initialized in the second state.

Another example method of exchanging messages can include one or more of the following steps presented in no particular order, and the method can include additional steps not included here. Two communication devices, "Device A" and "Device B", can be provided that are capable of transmitting data to each other via an end-to-end encryption protocol. Data structures can be provided to facilitate the end-to-end encryption including a first asymmetric key pair having a first public key and a first private key. The first public key can be stored on Device A, and the first private key can be stored on Device B. Each of Device A and Device B can have stored thereon a respective pseudo-random generator.

A first epoch key can be generated on Device A based on the first public key, and Device A can also generate a second asymmetric key pair having a second private key and a second public key. The first epoch key and the second public key can be transmitted by Device A and received by Device B. A first message key and a second message key can be generated independently on each of Device A and Device B. On Device A, the first message key can be based on the first public key. On Device B, the first message key can be based on the first private key and the first epoch key. On each device, the first message key can be provided as an input to the respective pseudo-random number generator and the second message key can be generated as output of each pseudo-random number generator.

Device A can encrypt a first message with the first message key and a second message with the second message key and transmit a first epoch that includes the first encrypted message and the second encrypted message. Device B can receive the first epoch and decrypt the first encrypted message with the first message key and the second encrypted message with the second message key.

When Device B begins to respond to Device A, Device B can generate a second epoch key based on the second public key previously transmitted by Device A, and Device B can generate a third asymmetric key pair having a third private key and a third public key. The second epoch key and the third public key can be transmitted by Device B and received by Device A. Device A and Device B can independently generate a third message key. On Device B, the third message key can be based on the second public key. On Device A, the third message key can be based on the second private key and the second epoch key.

Device B can encrypt a third message with the third message key and transmit a second epoch including the third encrypted message. Prior to transmitting the second epoch, Device B can delete the first message key and the second message key from the first epoch. Device A can receive the second epoch and decrypt the third encrypted message with the third message key.

Multiple epochs, each epoch including one or more encrypted messages, can be transmitted. For each epoch, all transmitted encrypted messages in the epoch can be transmitted from only one of Device A or Device B. Epochs can be transmitted from each of Device A and Device B in an alternating fashion such that Device A transmits every odd epoch and Device B transmits every even epoch.

Referring to the first message in the example method, a first header can be generated on Device A, Device A can generate a first ciphertext including the encrypted header and the first encrypted message, the header in plaintext can be appended to the first ciphertext, and Device A can transmit the first ciphertext and plaintext header. Device B can receive the first ciphertext and plaintext header and authenticate the ciphertext based on the plaintext header.

Device A can generate a message index, and the first header can include the message index. Device B can generate an nth message key based on the message index.

A root state can be provided at each of Device A and Device B. The respective pseudo-random number generator on each of Device A and Device B can be initialized based on the root state. An updated state can be generated on each of Device A and Device B based on the root state, and the pseudo-random number generator can be reinitialized based on the updated state.

A first shared key can be generated independently on each of Device A and Device B. On Device A the first shared key can be generated based on the first public key, and on Device B the first shared key can be generated based on the first private key and the first epoch key. A refresh key and a first state can each be generated independently on each of Device A and Device B, each based on the shared key and the root state. To generate the first message key on each device, the pseudo-random number generator can be initialized to the first state, the first refresh key can be provided as an input to the initialized pseudo-random number generator, and the first message key can be generated as an output of the pseudo-random number generator.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

DETAILED DESCRIPTION

Heretofore the following acronyms will be used herein:
CKA Continuous Key Agreement Dec Decapsulation
Enc Encapsulation
FS Forward Secrecy
FS-AEAD Forward-Secure Authenticated Encryption with Associated Data
KG Key Generator
mKey Message Key
PRF-PRNG Pseudo-Random Function
PRG Pseudo-Random Number Generator
PRG(w) PRG initialized to state w
QMP Qrypt Messaging Protocol Generally, example devices, systems, and methods presented herein can allow secure end-to-end message transfer between communication devices over an unsecure channel via a Qrypt Messaging Protocol (QMP). The QMP can be a software implementation of a double ratchet providing immediate decryption, forward secrecy, and post-compromise security. In some examples, the QMP can allow a legitimate message received to be immediately decrypted even if one or more messages before the most recent legitimate message have not been received. In some examples, the QMP can facilitate message loss resilience, whereby if a message is lost entirely, parties are nevertheless able to continue to communicate. Forward secrecy can be maintained during a secure messaging session such that if the state of a communicating device is leaked, none of the previous messages are compromised. Post-compromise security can be maintained during a secure messaging session such that once the exposure of a communication device's state ends, security can be restored after a few communication rounds.

Figure 1:
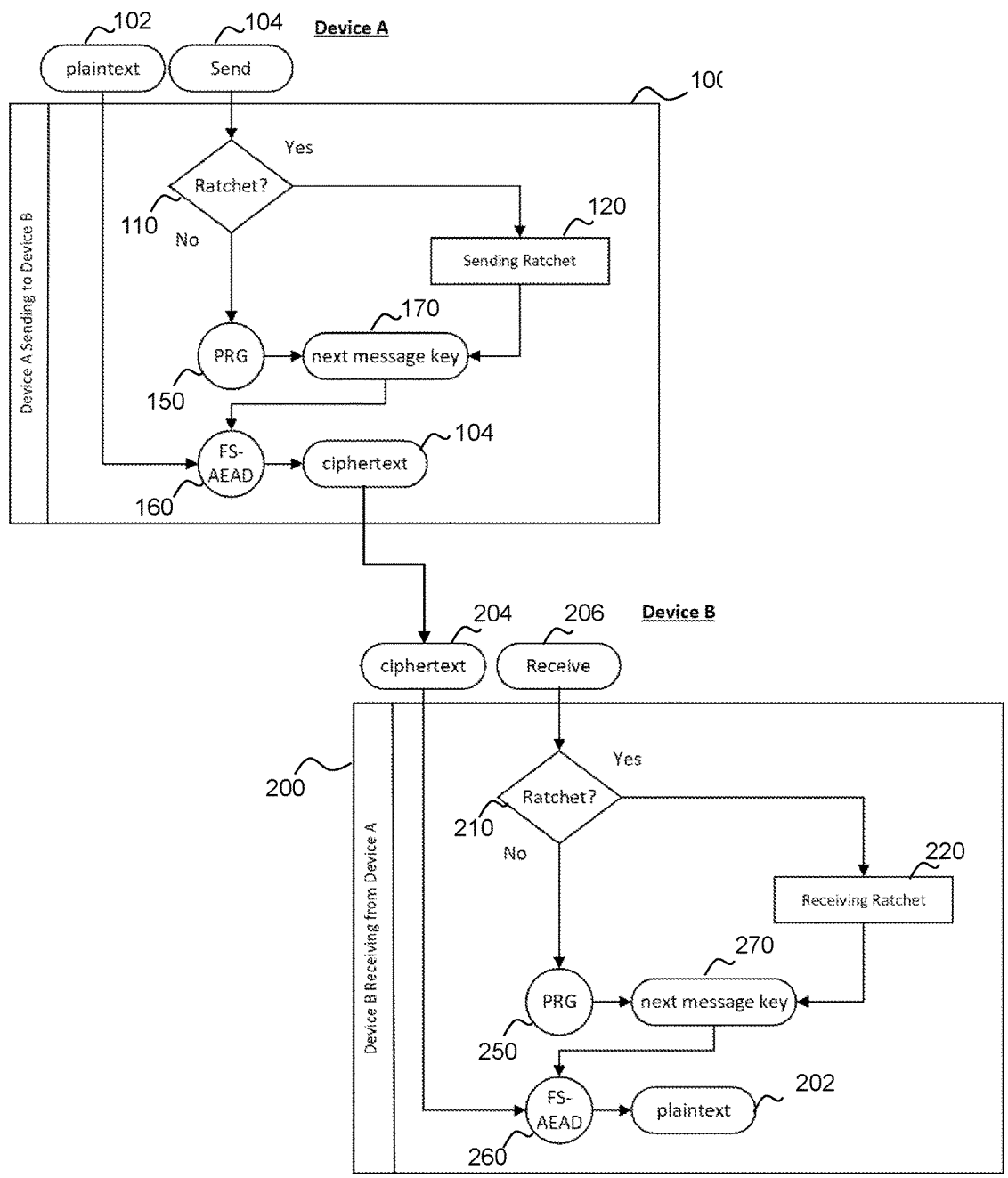
FIG. 1 is a flow diagram illustrating, example functional blocks, data structures, and method steps that can be used to send messages from a first device to a second device according to aspects of the present invention.

FIG. 1 is a flow diagram illustrating, at a high level, example functional blocks, data structures, and method steps that can be used to send messages from Alice at a first device (Device A) 100 to a Bob at a second device (Device B) 200. Device A 100 can be provided with a message 102 (i.e. a plaintext, voice, video, sensor data, and other formats) and a send command 104 requesting the message 102 be encrypted for transmission. The send command 104 can cause Device A 100 to initiate a ratchet query 110. If it is determined by the ratchet query 110 that message keys should be refreshed by a ratchet, Device A can initiate a sending ratchet 120 algorithm, and the sending ratchet 120 can then generate the next message encryption key 170 to be used to encrypt the message 102. If it is determined by the ratchet query 110 that the message keys do not need to be refreshed by a ratchet, Device A can initiate a pseudo-random number generator (PRG) 150 to generate the next message key 170. The next message key 170 and the message 102 can then be provided as an input to an encryption algorithm 160. The encryption algorithm 160 can generate a ciphertext 104 that includes the message 102 encrypted by the message key 170, and the ciphertext 104 can be transmitted to Device B 200.

Device B 200 can receive ciphertext 204 and a receive command 206 triggered by the arrival of the ciphertext 204. Note that an object of QMP is to allow secure communication between Alice and Bob over unsecure communication channels, and as such, transmissions received by Bob may or may not be identical to transmissions sent by Alice. Ciphertext 204 received by Bob can be identical to ciphertext 104 sent by Alice if the ciphertext 104 retains its integrity (e.g. not modified by attack or degraded) during transmission.

The receive command 206 can cause Device B 200 to perform a ratchet query 210. Similarly, as in Device A 100, if it is determined by the ratchet query 210 that message keys on Device B 200 should be refreshed by a ratchet, Device B 200 can initiate a receiving ratchet 220 algorithm, and the receiving ratchet 120 can then generate the next message encryption key 270 to be used to decrypt the ciphertext 204. If it is determined by the ratchet query 210 that the message keys do not need to be refreshed by a ratchet, Device B 200 can initiate a pseudo-random number generator (PRG) 250 to generate the next message key 270. The next message key 270 and the ciphertext 204 can then be provided as an input to an encryption algorithm 260. The encryption algorithm 260 can generate a message 202 decrypted by the message key 270.

Device A 100 and Device B 200 can each be configured such that the message keys 170, 270 generated on the respective devices 100, 200 are compatible and/or identical to facilitate receipt of a message 202 that is identical to the sent message 102 as follows. The ratchet queries 110, 210 on both Device A 100 and Device B 200 can be coordinated such that either both ratchet queries 110, 210 determine that the message keys should be refreshed or neither ratchet query 110, 210 determines that the message keys should be refreshed. If both ratchet queries 110, 210 determine that the message keys should be refreshed, the sending ratchet 120 and the receiving ratchet can independently generate compatible and/or identical message keys 170, 270. Likewise, if both ratchet queries 110, 210 determine that the message keys should not be refreshed, the PRGs 150, 250 on the respective devices 100, 200 can independently generate compatible and/or identical message keys 170, 270. The ciphertext 204 received by Device B 200 can be identical to the ciphertext 104 transmitted by Device A 100 if the ciphertext 104 is not tampered with or degraded during transit. The encryption algorithm 160 can be compatible with the decryption algorithm 260 so that the ciphertext 104 generated by the encryption algorithm 160 based on the message 102 and the message key 170 can be decrypted by the decryption algorithm 260 using message key 270 to generate a message 202 that is identical to the transmitted message 102.

In some examples, the PRGs 150, 250 can generate the next message key 170, 270 based on a previous message key and the sending ratchet 120 and receiving ratchet 220 can be used to generate a first key to seed a sequence of keys generated by the PRGs 150, 250, thereby facilitating a double ratchet protocol.

Figure 2:
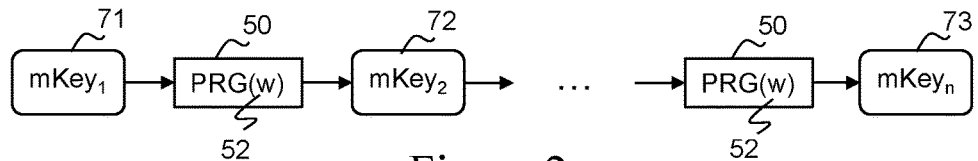
FIG. 2 is a flow diagram illustrating an example implementation including iterative calls to a pseudo-random number generator to produce a sequence of message keys according to aspects of the present invention.

FIG. 2 illustrates an example implementation including iterative calls to a PRG 50 to produce a sequence of message keys 71, 72, 73. In some examples, each device communicating in a secure session can have identical or compatible PRGs for independently generating a progression of message keys on each communication device. Device A 100 and Device B 200 can each have a PRG 150, 250 that functions as illustrated by the PRG 50 in FIG. 2. Seeded with the same initial value or seed key 71, the PRG 50 can produce a predictable set of keys 72, 73 for encrypting and decrypting. A message key ratchet step can include a call to the PRG 50 to advance the message keys from one message key to the next message key in a sequence. The progression of message keys can be generated by the PRG 50 through predictable one-way functions like hashes. When sending and receiving messages, a sending device and a receiving device (e.g. Device A 100 and Device B 200 as illustrated in FIG. 1) can be synchronized at the first message such that each device starts with the same seed key 71. Each device can independently increment the PRG 50 on the respective device to produce the same subsequent $n^{th}$ message key 73.

In some examples, the PRG 50 can operate in one of a plurality of states 52, such that a PRG 50 in a first state seeded with a seed key 71 can produce an $n^{th}$ message key 73 that is different than an $n^{th}$ message key 73 that can be produced by the same PRG 50 seeded by the same seed key 71 if the PRG is in a second state that is different than the first state. That is, identical PRGs 50 fed by identical seed keys 71 that are initialized by different states 52 will not produce compatible message keys, and identical PRGs 50 in the same state 52 fed by identical seed keys 71 can reliably produce compatible message keys.

In some examples, the PRG can be configurable from a stream cipher and can produce output for an unknown or variable length of "key" data given "input" data. The PRG can be storable to facilitate a cryptographic algorithm stream state that is continuously running into the future and that can be serialized to storage. In some examples, the specific PRG can be determined at the beginning of the Secure Messaging construction and can be reconstructed (reset) upon re-configuration. A configuration of one conversation can be different from another conversation configuration; meaning, conversations between any two users in the Secure Messaging instance and its PRGs for send and receive.

In some examples, the message key ratchet can be reset by reinitializing the PRG to an updated state 52 and providing a new seed key or refresh key 71. The reinitialization and providing of the new seed key can serve as a second ratchet, or epoch ratchet in a double ratchet protocol.

Figure 3:
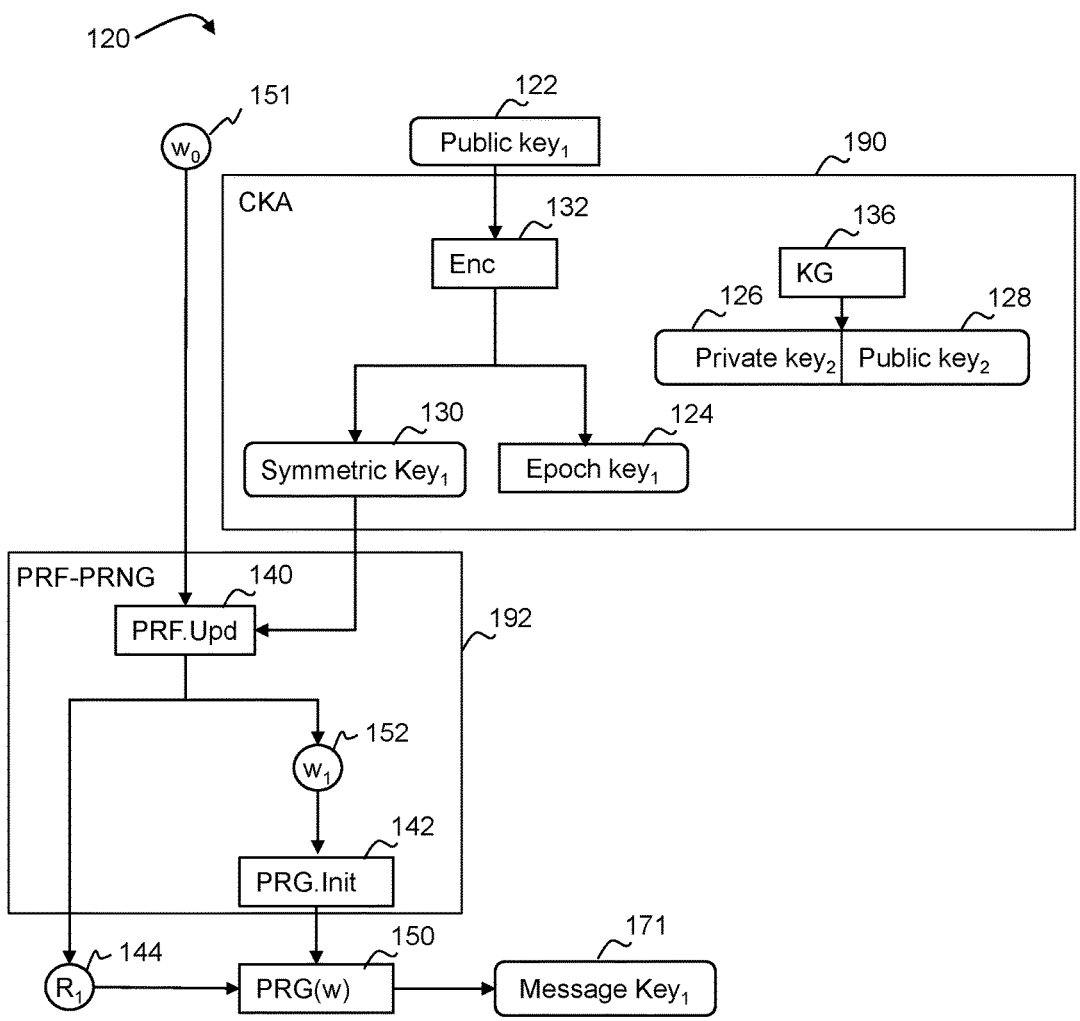
FIG. 3 is a flow diagram outlining example functional blocks, data structures, and method steps that can be included in a sending ratchet according to aspects of the present invention.

FIG. 3 is a flow diagram outlining example functional blocks, data structures, and method steps that can be included in a sending ratchet such as the sending ratchet 120 illustrated in FIG. 1. Referring collectively to FIGS. 1 and 3, in some examples, a sending device 100 can start with a first public key 122 and a PRG state 151 from a previous epoch. The sending ratchet 120 can provide as outputs an updated PRG state 152, a first message key 171, an asymmetric key pair including a second private key 126 and a second public key 128, and an epoch key 124. The PRG 150 can be initialize by the updated state 152 by the sending ratchet 120, and the first message key 171 can be used as a seed key from which the PRG 150 can generate a sequence of message keys as discussed in relation to FIG. 2.

The epoch key 124 and second public key 128 can be transmitted to a receiving device 200. The second private key 126 can be saved to the sending device 100 for use in a subsequent receiving ratchet step in the subsequent epoch when Device A 100 becomes the receiving device and Device B 200 becomes the sending device.

Figure 4:
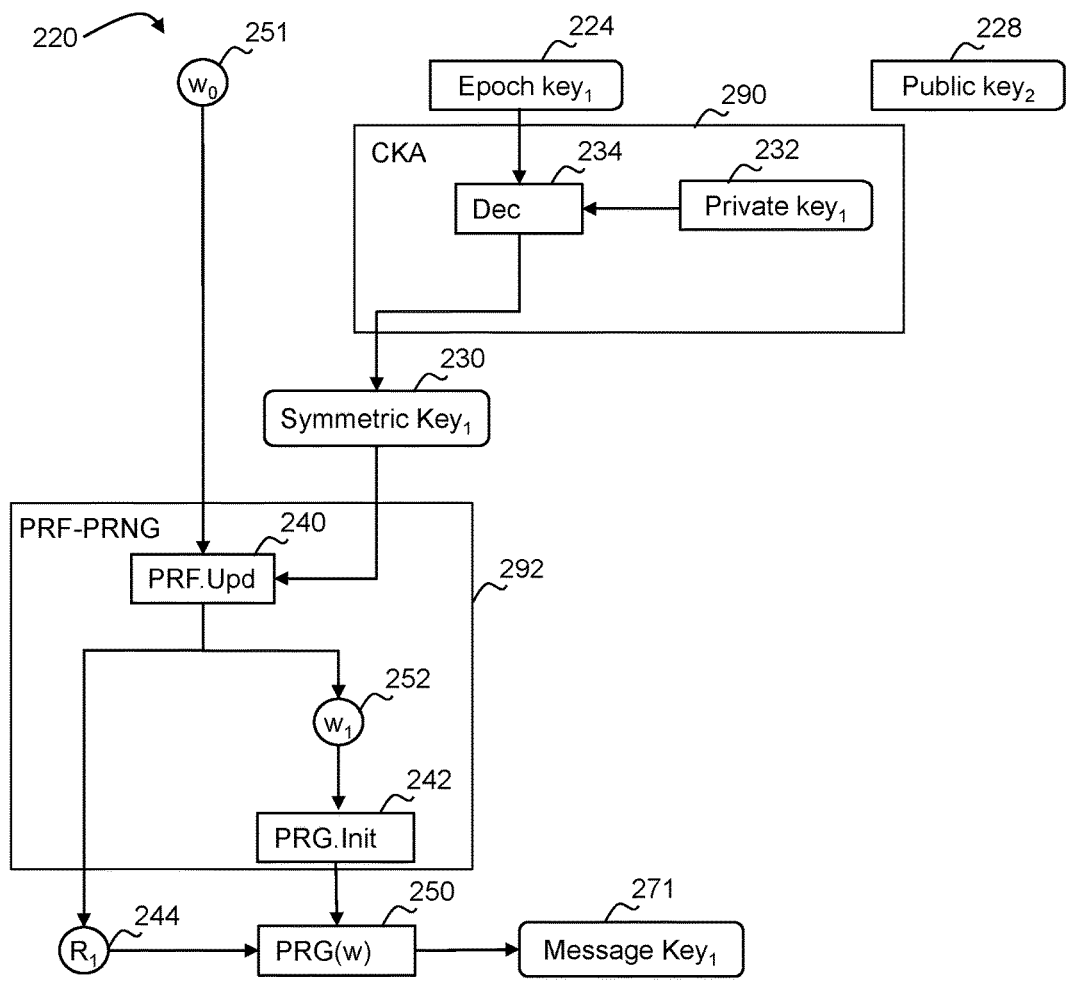
FIG. 4 is a flow diagram outlining example functional blocks, data structures, and method steps that can be included in a receiving ratchet according to aspects of the present invention.

FIG. 4 is a flow diagram outlining example functional blocks, data structures, and method steps that can be included in a receiving ratchet such as the receiving ratchet 220 illustrated in FIG. 1. Referring collectively to FIGS. 1, 3, and 4, in some examples, a receiving device 200 can receive an epoch key 224 that can be the epoch key 124 transmitted by the sending device 100 and a second public key 228 that can be identical to the second public key 128 transmitted from the sending device 100. Note that the epoch key 124 and the second public key 128 can be transmitted from Alice to Bob over an unsecure communication channel, and as such, the epoch key 224 and the second public key 228 received by Bob may or may not be identical to keys 124, 128 sent by Alice. For the purposes of this example, it is assumed that the epoch key 224 and the second public key 224 received by Bob are identical to the epoch key 124 and the second public key 128 transmitted by Alice. The receiving device, Device B 200 can have stored in memory a PRG state 251 from the previous epoch that can be identical to the PRG state 151 from the previous epoch on the sending device 100.

On Device B 200, the receiving ratchet 220 can generate as outputs an updated PRG state 252 that can be identical to the updated PRG state 152 generated on the sending device 100 and a first message key 271 that can be identical to and/or compatible with the first message key 171 generated on the sending device 100. The PRG 250 can be initialize by the updated state 252 by the receiving ratchet 220, and the first message key 271 can be used as a seed key from which the PRG 250 on the receiving device 200 can generate a sequence of message keys as discussed in relation to FIG. 2.

Each device 100, 200 can include a Continuous Key Agreement (CKA) functional block 190, 290. Each CKA 190, 290 can execute an agreement algorithm that can provide two main functions: a way to generate a key pair 126 128, and a way to calculate an agreement or shared key (Encapsulate/Decapsulate) 124, 224. Referring to FIG. 3, the sending device can start with a first public key 122 which can be provided as an input to an encapsulation function 132 which can generate as outputs a symmetric key 130 and an epoch key 124. Referring to FIG. 4, the epoch key 224 on the receiving device can be identical to the epoch key 124 created on the sending device, and the epoch key 124 can be created such that when the epoch key 224 is input together with the first private key 232 associated with the first public key 122 into a decapsulation function 234, the symmetric key 230 generated on the receiving device is identical to and/or compatible with the symmetric key 130 generated on the sending device. In other words, the first asymmetric key pair 122, 232 can be used to create a symmetric key 130, 230 on each device.

Figure 5:
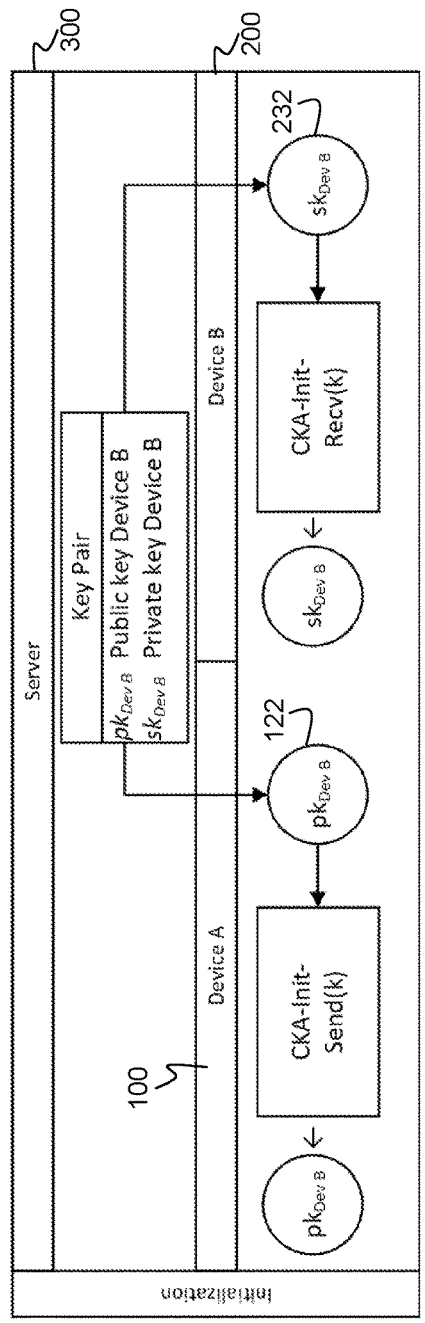
FIG. 5 is a flow diagram illustrating initialization of a CKA according to aspects of the present invention.

FIG. 5 is a flow diagram illustrating CKA initialization. As illustrated in FIG. 5, at the beginning of a communication session, a first asymmetric key pair can be provided from a server 300 (which can act as a centralized key authority), the first public key 122 received by sending Device A 100, and the first private key 232 received by receiving Device B 200. Communication from the server 300 to the devices 100, 200 can be over an unsecure network, or to increase security, over a secured network. Once each device 100, 200 is initialized with the first asymmetric key pair, communications between the devices can be conducted over an unsecure network.

Figure 6:
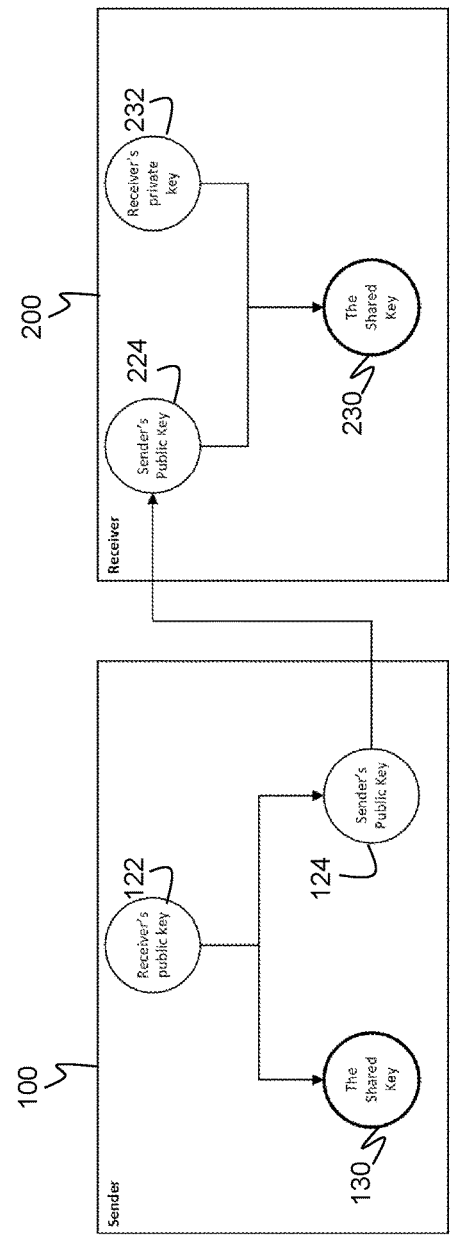
FIG. 6 is a flow diagram illustrating the creation of a shared key on a sending and a receiving device based on an asymmetric key pair according to aspects of the present invention.

FIG. 6 is a flow diagram illustrating the creation of a shared key 130, 230 on each device 100, 200 based on an asymmetric key pair 122, 232. FIG. 6 illustrates the first public key 122 being used by a sending device 100 to generate a shared key 130 and an additional public key (epoch key) 124, the additional public key 224 being received by a receiving device 200, and the additional public key 224 being combined with a first private key 232 to create a shared key 230. The epoch key 124 can be transmitted over an unsecure network.

Figure 7:
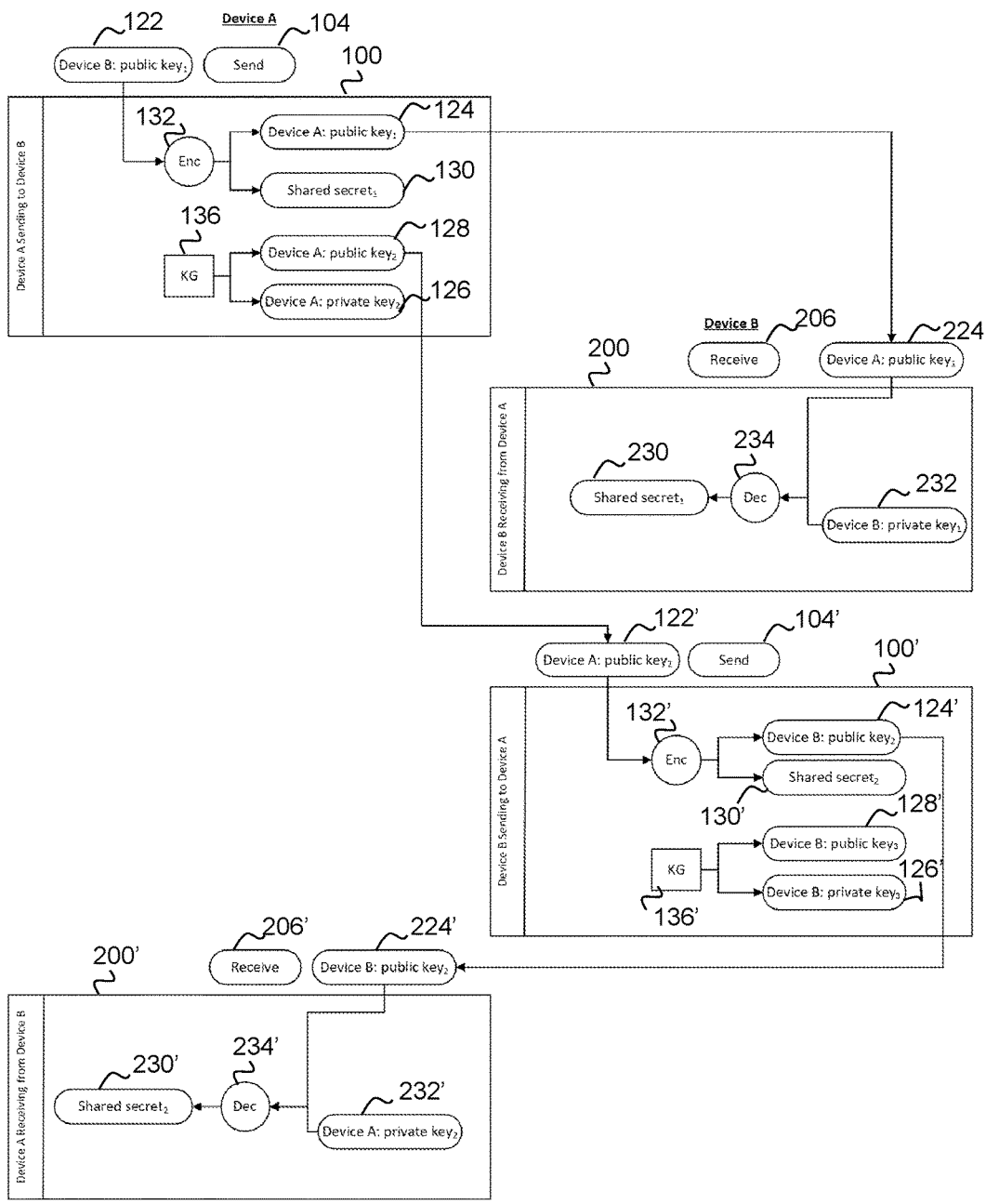
FIG. 7 is a flow diagram illustrating an example exchange of public keys and propagation of private keys to generate a symmetric key for subsequent epoch ratchets according to aspects of the present invention.

FIG. 7 is a flow diagram illustrating an example exchange of public keys and propagation of private keys to generate a symmetric key for subsequent epoch ratchets. In the example, Alice is the first sender, and sends messages on every odd epoch from Device A, and Bob is the first receiver and receives messages on every odd epoch and sends messages on every even epoch. Device A begins as the first sending device 100. Device A can be provided a first public key 122 provided by an initialization step, or can have in storage, the first public key 122 provided from Device B in a previous epoch. Device A can utilize an encapsulation function 132 to generate a public key or epoch key 124 and a shared secret or symmetric key 130. Device A can utilize a key generation function 136 to generate an asymmetric key pair 126, 128. The second public key 128 and the epoch key 124 can be transmitted to Device B. Device B begins as the first receiving device 200. Device B can receive a public key or epoch key 224 that can be the epoch key 124 transmitted from Device A acting as the first sending device 100. Device B can have a private key 232 provided in an initialization step or saved from a previous epoch. The epoch key 224 and the private key 232 can be combined in a decapsulation function 234 to create a shared secret or symmetric key 230 that can be identical and/or compatible with the first symmetric key 130 generated by the first sending device 100, Device A.

During a first epoch, the first sending device 100, Device A can send messages encrypted with message keys generated based on the first symmetric key 130, and the first receiving device 200, Device B can decrypt received ciphertext with message keys generated based on the first symmetric key 230.

To begin a second epoch, Bob can begin to send messages from Device B, at which point Device B can transition from being the first receiving device 200 and can become the second sending device 100'. Device B, acting as the second sending device 100', can feed a second public key 122', that can be the second public key 128 transmitted from Device A 100 (when Alice was sending in the previous epoch), into an encapsulation function 132' identical or similar to the encapsulation function 132 used by Device A when it was acting as the first sending device 100. The encapsulation function 132' can generate a second epoch key 124' and a second shared secret or symmetric key 130'. Device B, acting as the second sending device 100' can have a key generation function 136' that generates a third asymmetric key pair 126', 128'. The second epoch key 124' and the third public key 128' can be transmitted from Device B acting as the second sending device 100'.

Once Alice begins receiving messages from Bob, Device A can transition from being the first sending device 100 to a second receiving device 200'. As the second receiving device 200', Device A can receive a second epoch key 224' that can be the second epoch key 124' transmitted from Device B acting as the second sending device 100'. Device A, acting as the second receiving device 200', can combine the second epoch key 224' with a private key 232' that can be the second private key 126 generated by Device A when it was acting as the first sending device 100. The second epoch key 224' and the private key 232' can be combined in a decapsulation function 234' that can be identical or similar to the decapsulation function 234 used by Device B acting as the first receiving device 200. The decapsulation function 234' can output a second shared secret 230' that can be identical and/or compatible with the second shared secret 130' generated by Device B acting as the second sending device 100'. The third public key 128' can be received by Device A acting as the second receiving device 200' for use when Device A becomes the third sending device in the subsequent epoch.

Figure 8:
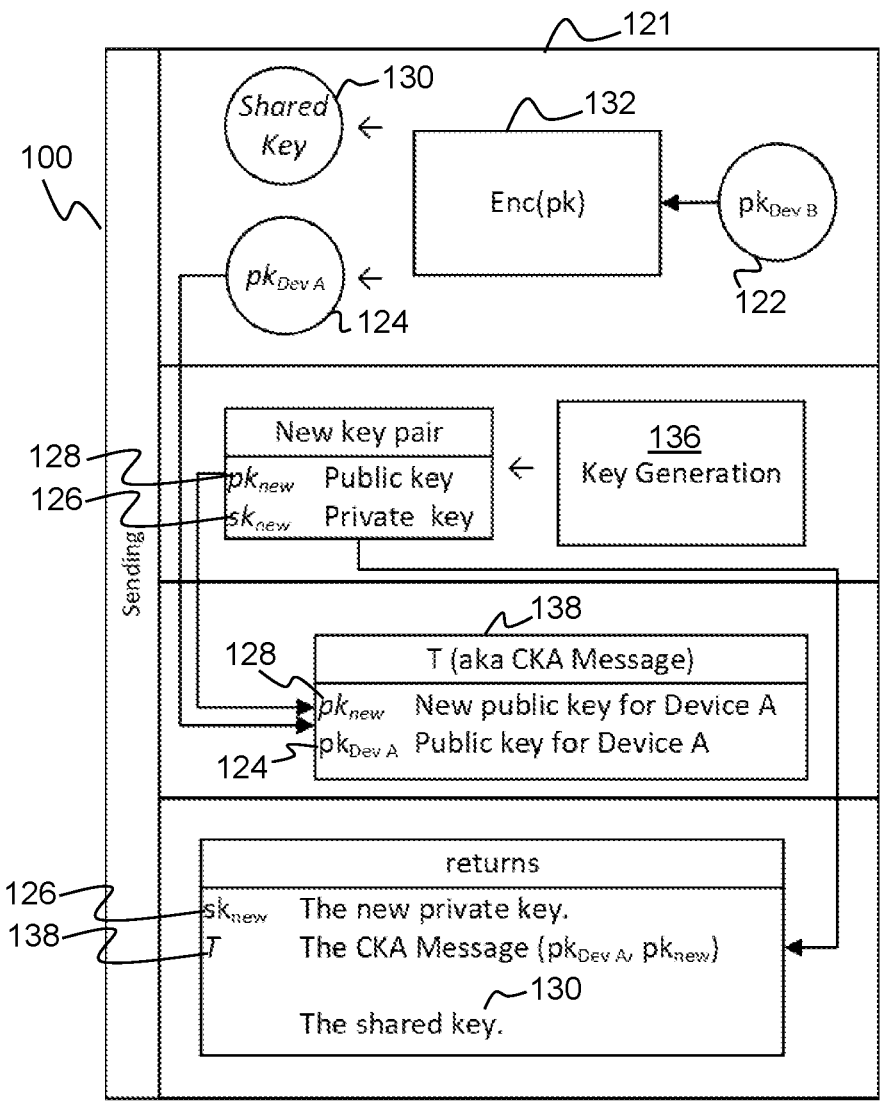
FIG. 8 is a flow diagram illustrating functionality an example CKA functional block from the perspective of a sending device according to aspects of the present invention.

FIG. 8 is an example illustration of a CKA functional block 121 from the perspective of a sending device 100. The CKA functional block 121 can include an encapsulation function 132 and a key generation function 136. The sending device 100 can provided, or can have stored from a previous epoch, a public key 122 associated with a private key on a receiving device (aka Device B's public key). With the public key 122 in hand, a shared key (aka symmetric key) 130 can be generated by passing the receiver's public key 122 to the encapsulation function 132. The encapsulation function 132 can also create an additional public key (aka epoch key) 124 associated with the sending device 100. A new key pair including a second public key 128 and a second private key 126 can be generated by the key generation function 136. No private key need be generated to form a pair with the additional public key (epoch key) 124 as the additional public key 124 can be used for only generating a symmetric key at the receiving device in the current epoch and the newly generated key pair 126, 128 can be used when the sending device becomes the receiving device in the subsequent epoch.

Once the new key pair 126, 128 and the additional public key (epoch key) 124 are generated, they can be packaged in a CKA message T 138. The public keys 124, 128 can be passed from the sending device 100 to the receiving device 200 (e.g., see FIG. 8) encapsulated within a message as either part of encrypted cipher text or within an unencrypted header. The new private key 126 can be stored on the sending device 100 to be used when the sending device 100 receives a message from the current receiving device.

Figure 9:
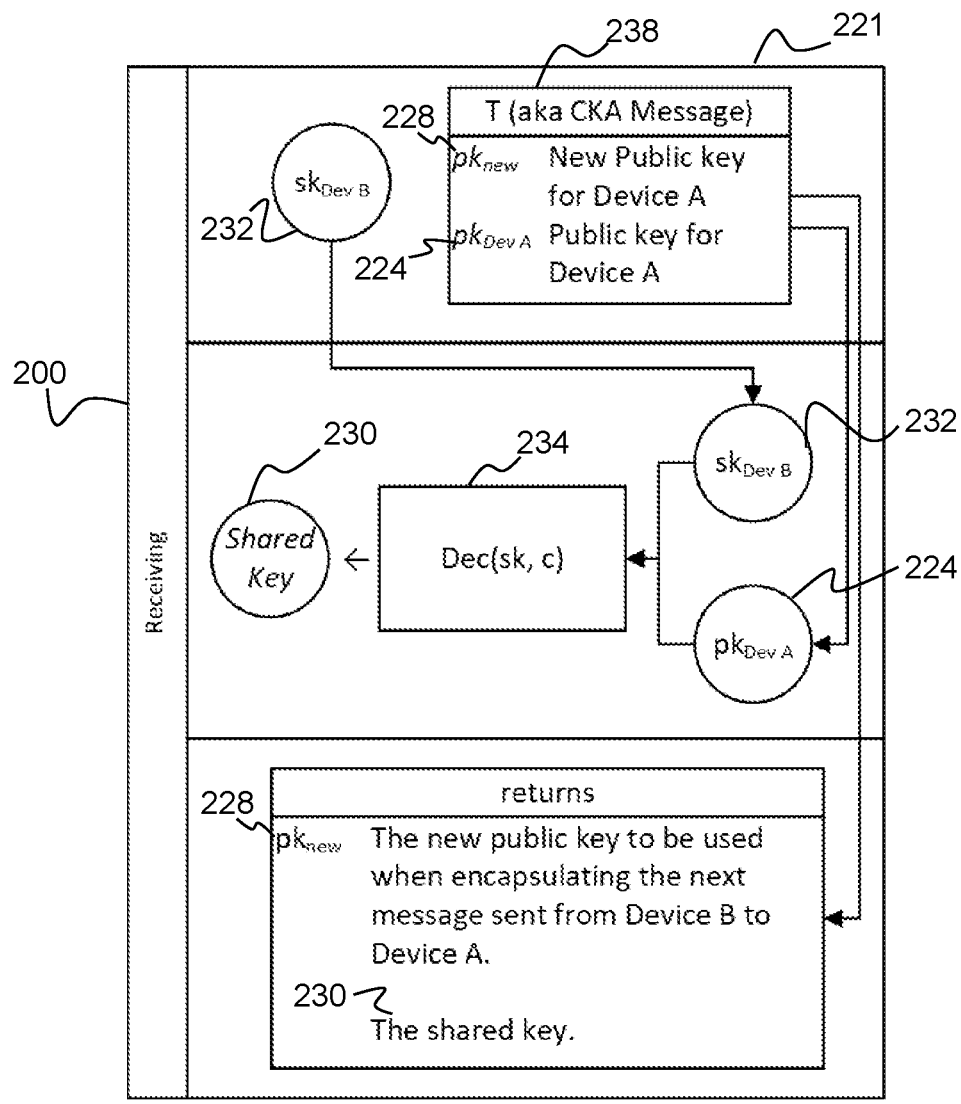
FIG. 9 is a flow diagram illustrating functionality of an example CKA functional block from the perspective of a receiving device according to aspects of the present invention.

FIG. 9 is an illustration of an example CKA functional block 221 from the perspective of a receiving device 200. Referring collectively to FIGS. 7 and 8, the receiving device 200 can be provided, or have stored from a previous epoch, the private key 232 associated with the first public key 122 on a receiving device. The receiving device 200 can receive a CKA message T 238 that can be the CKA message T 138 transmitted by the sending device 100. The CKA message 238 can contain an additional public key 224 that can be identical to the additional public key 124 transmitted by the sending device 100 and a second public key 228 associated with the private key 126 stored on the sending device 100. The private key 232 and the additional public key 224 generated by the encapsulation function 132 on the sending device 100 can be both provided as inputs to a decapsulation function 234 on the receiving device 200, and the decapsulation function 234 can generate a shared key 230 as an output. The shared key 230 generated on the receiving device 200 can be identical and/or compatible to the shared key 130 generated on the sending device 100. The additional public key 228 can be stored on the receiving device 200 to be used in the subsequent epoch when the receiving device becomes the sending device.

In some examples, a CKA can use an asymmetric algorithm such as the Diffie-Hellman algorithm to establish an initial shared secret or symmetric key. The CKA can be configurable and examples of specific implementations can be either RSA, EC25519 or any post-quantum secure algorithm, like lattice-based, code-based, and others. This configurable parameter can be determined at the beginning of the secure messaging session construction, and thus can be reconstructed or reset upon re-configuration. A single configuration of one conversation can be different from another conversation configuration. Numerous specific implementations of the CKA are contemplated including utilizing asymmetric and/or symmetric algorithms for key agreement.

Referring again to FIGS. 3 and 4, once a symmetric key 130, 230 is generated on each of a sending device and a receiving device, a CKA 190, 290 can provide cryptographic key agreements (aka shared or symmetric keys) 130, 230 as an input to a Pseudo-Random Function (PRF-PRNG) 192, 292 and, in turn, the resulting output of the PRF-PRNG 192, 292 can be provided as an input to the PRG 150, 250 to refresh the predictable production of message keys. Each PRF-PRNG 192, 292 can have an update function 140, 240 and an initialization function 142, 242. Inputs to the update function 140, 240 can include the symmetric key 130, 230 and a previous state 151, 251 to generate as outputs an updated state 152, 252 and a seed key 144, 244. The initialization function 142, 242 can initialize the PRG 150, 250 to the updated state 152, 252. The PRG 150, 250 can be provided the seed key 144, 244 and produce predictable keys (i.e. message key 171 271), as discussed in relation to FIG. 2 that can be used to encrypt/decrypt messages. Hence, if an attacker compromises the PRG 150, 250, a subsequent refresh via the CKA (progressing an epoch ratchet) can restore security.

Each PRF-PRNG 192, 292 can provide an additional layer of protection when the CKA key 130, 230 is known to an attacker. In some examples, the PRF-PRNG 192, 292 can accept two random inputs and can therefore be resilient against the compromise of either one of the shared keys or the PRG state. In some examples, the two inputs are the key produced by CKA (shared secret or symmetric key) 130, 230 and the previous state of the PRG 151, 251. Hence, if the CKA key 130, 230 is compromised, once updated via the PRF-PRNG 192, 292, security can be restored. Similarly, if the state of the PRG 150, 250 is compromised, once updated via the PRF-PRNG 192, 292, security can be recovered. However, if both the CKA key 130, 230 and the PRG state 152, 252 are compromised, then security may not be recoverable through an update via the PRF-PRNG 192, 292.

In some examples, the CKA can be used in each epoch ratchet to generate a new shared secret in a fashion that is predictable to the intended communication devices, but which is difficult to predict by an unintended recipient. The new shared secret than then be used to refresh the PRG's production of message keys. By producing each message key by the relatively computationally light PRG and refreshing the PRG through the relatively computationally intense CKA algorithm, some examples presented herein can provide robust end-to-end encryption with efficient use of computational resources.

Figure 10:
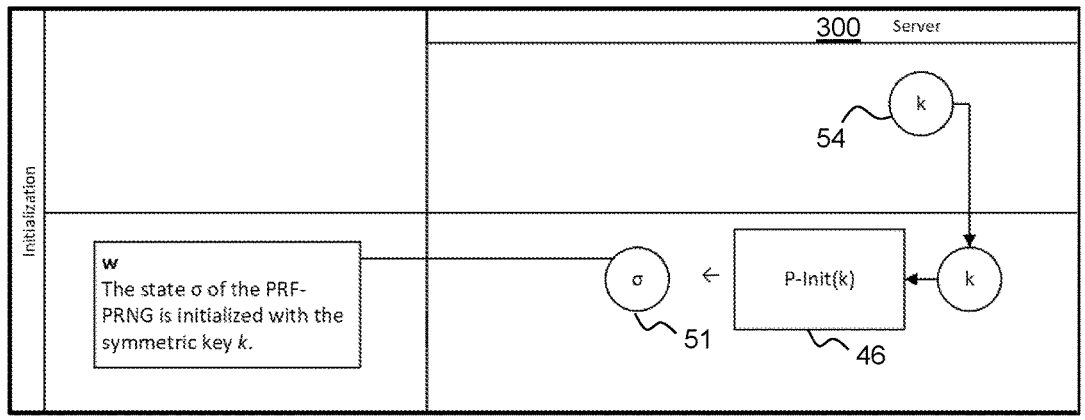
FIGS. 10, 11, 12, and 13 are flow diagrams illustrating initialization, seeding, and progression of a PRG according to aspects of the present invention.
Figure 11:
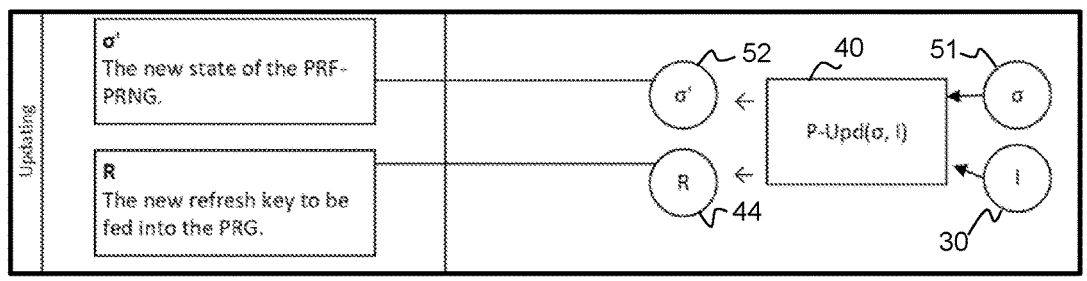
Figure 12:
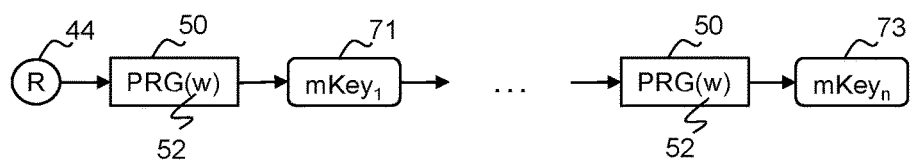

FIGS. 10, 11, 12, and 13 illustrate initialization, seeding, and progression of a PRG 50. In some examples, the state of the PRG 50 can be updated based on its previous state. When starting a conversation, a symmetric initialization key 54 key can be retrieved by each communication device from a server 300 as illustrated in FIG. 10. The initialization key 54 can be provided as an input to an initialization function 46. The initialization function 46 can provide as an output, a root state 51. The root state 51 and a symmetric key 30 can be provided as inputs into an update function 40, and the update function 40 can produce a first state 52 and a seed key 44 as illustrated in FIG. 11. The symmetric key 30 can be a symmetric key 130, 230 generated by a CKA algorithm as described herein. The update function 40 can be an update function of a PRF-PRNG 140, 240 as described herein. The PRG 50 can operate in the first state 52 to generate the first sequence of message keys 71, 73 in a conversation. Thereafter, the current PRG state and the current symmetric key can be provided as inputs to the update function 40 to produce the state and the seed key for the subsequent epoch as illustrated in FIG. 12.

Figure 13:
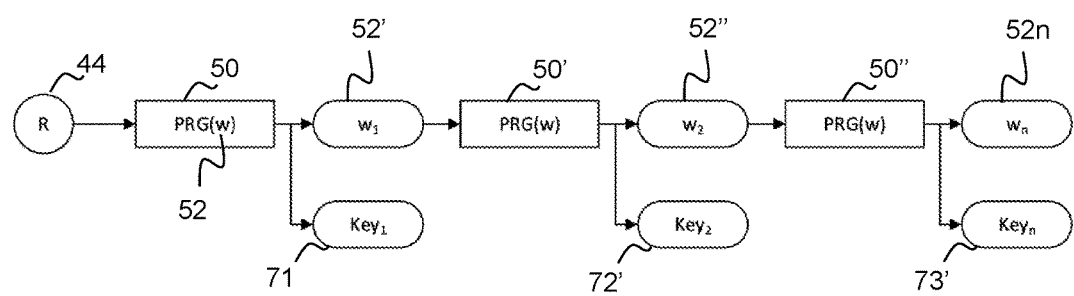

Alternatively, as illustrated in FIG. 13, to generate message keys 72', 73' in an epoch subsequently after generating the first message key 71, the current PRG state and only the current PRG state can be provided as input to the update function 40 to produce updated states 52', 52'', 52n, and the PRG can be iteratively initialized with the updated state 52', 52'' and generate a new message key 72', 73' in each state. The first key 71 can be generated like described in relation to the example illustrated in FIGS. 11 and 12, by providing the update function 40 the root state 51 and the symmetric key 30 to generate the first state 52 and seed key 44, then initializing the PRG with the first state 52 and providing the seed key 44 to the PRG to generate the first key 71. After generation of the first key 71, rather than generating subsequent keys as illustrated in FIG. 12, the first state 52 can be fed into the update function 40 without providing an updated symmetric key 30, the update function 40 can generate a first updated state 52' based on the first state 52, the PRG 50 can be initialized with the updated state 52', and the PRG 50' in the updated state 52' can generate a second message key 72'. The update function 40 can thereafter be provided the current PRG state 52' to produce an updated state 52'', and each time the PRG is reinitialized with an updated state, the PRG can output a new message key 72', 73'. At the beginning of a new epoch, the final PRG state 52n from the previous epoch and a new symmetric key from the CKA can be provided as inputs 51, 30 to update function 40 to produce a refresh key 44 and new state 52. Message keys in the new epoch can then be generated as illustrated in either FIG. 12, FIG. 13, or some combination thereof.

Hence, both the sending and receiving devices can start with a PRG 50 in the same state 52, and each device would therefore be able to produce the same sequence of message keys 71, 73 if each device feeds the same seed key 44 into the respective PRGs 50. If, for each increment in an epoch ratchet, the PRG is updated based on its previous state, the progression of the PRG states can be predictable by each of the intended communication devices, thereby facilitating message loss retrieval.

Figure 14:
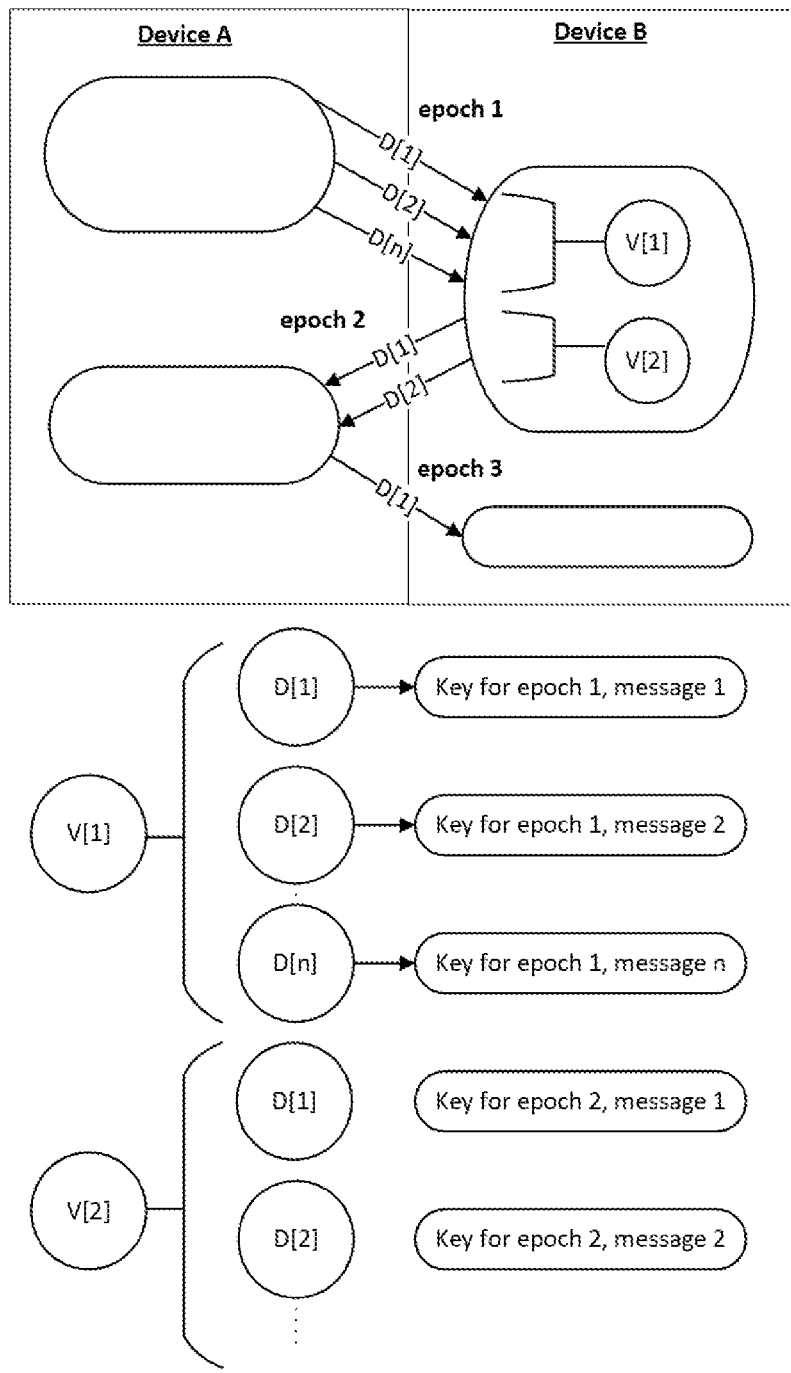
FIG. 14 is a flow diagram illustrating the use of epochs as a message grouping mechanism according to aspects of the present invention.

FIG. 14 illustrates the use of epochs as a grouping mechanism to indicate when an epoch ratchet can be performed. In some examples, an epoch can be defined as a series of data transmission, blocks, or messages in a single direction from Device A to Device B, or vice versa such that all messages transmitted in an epoch are transmitted from a single device, and in following epoch, all messages are transmitted by a different device. Each individual epoch can represent a CKA session, before a new epoch initializes a new CKA session with an epoch key. Within the epoch, each message can be encrypted with a new message key. The determination to complete an epoch ratchet can be made by analyzing if the current epoch has just changed, i.e. Alice was receiving and is now sending to Bob or Alice was sending and is now receiving from Bob. In some examples, during an epoch ratchet step, the seed key and the state of the PRG can be refreshed or updated so that a new sequence of message keys can be generated. Hence, if an attacker compromises an epoch session, security is restored when the devices enter the following epoch. The epoch ratchet step can thereby provide post-compromise security.

In some examples, messages in an epoch can be enumerated by a message counter index or other designator to track the progression of messages in the epoch. The message counter index or designators can be reset for each new epoch.

Some examples can include a Forward-Secure Authenticated Encryption with Associated Data (FS-AEAD) algorithm to encrypt and decrypt a single message. The FS-AEAD algorithm can utilize a unique key for each message and utilize a header to verify the integrity of each message. The FS-AEAD can be a message encryption and decryption mechanism that can accept as an input a stream including a string, file, or voice conversation packet and produce as an output, the stream in decrypted or encrypted form. The FS-AEAD cipher can simultaneously provide confidentiality, integrity, and authenticity.

In some examples, the FS-AEAD can be a block cipher, where the encrypt/decrypt are fed through in defined size packets. The FS-AEAD can be based on a symmetric algorithm including for example Advanced Encryption Standard (AES) with CCM (Counter with CBC-MAC). CCM can combine both encryption and authentication by combining the two modes Counter (CTR) and Cipher Block Chaining (CBC) into one cryptographic primitive. In CTR mode, an incrementing counter can be encrypted to produce a sequence of blocks which can then be XORed with the plaintexts to produce ciphertexts. In CBC mode, the plaintext can be XORed with the previous ciphertext before being encrypted. In some implementations, there is no ciphertext before the first plaintext, so a randomly chosen initialization vector (IV) can be used instead. For example, CBC-MAC messages can be encrypted with standard AES and then use the last block as a fixed length Message Authentication Code (MAC). CTR mode can be used to provide the actual ciphertext. In such an implementation, CBC-MAC can provide authentication—if even one byte changes it can fail—and CTR can provide the actual encrypt/decrypt of the plaintext message.

In some examples the FS-AEAD algorithm can append verifiable associated data to an encrypted message to create a ciphertext on a sending device, and then on an intended receiving device, the FS-AEAD algorithm receiving the ciphertext as an input can use the associated data to verify that the encrypted message is correctly decrypted and untampered. The FS-AEAD can thereby detect tampering of the encrypted message and/or the header.

Figure 15:
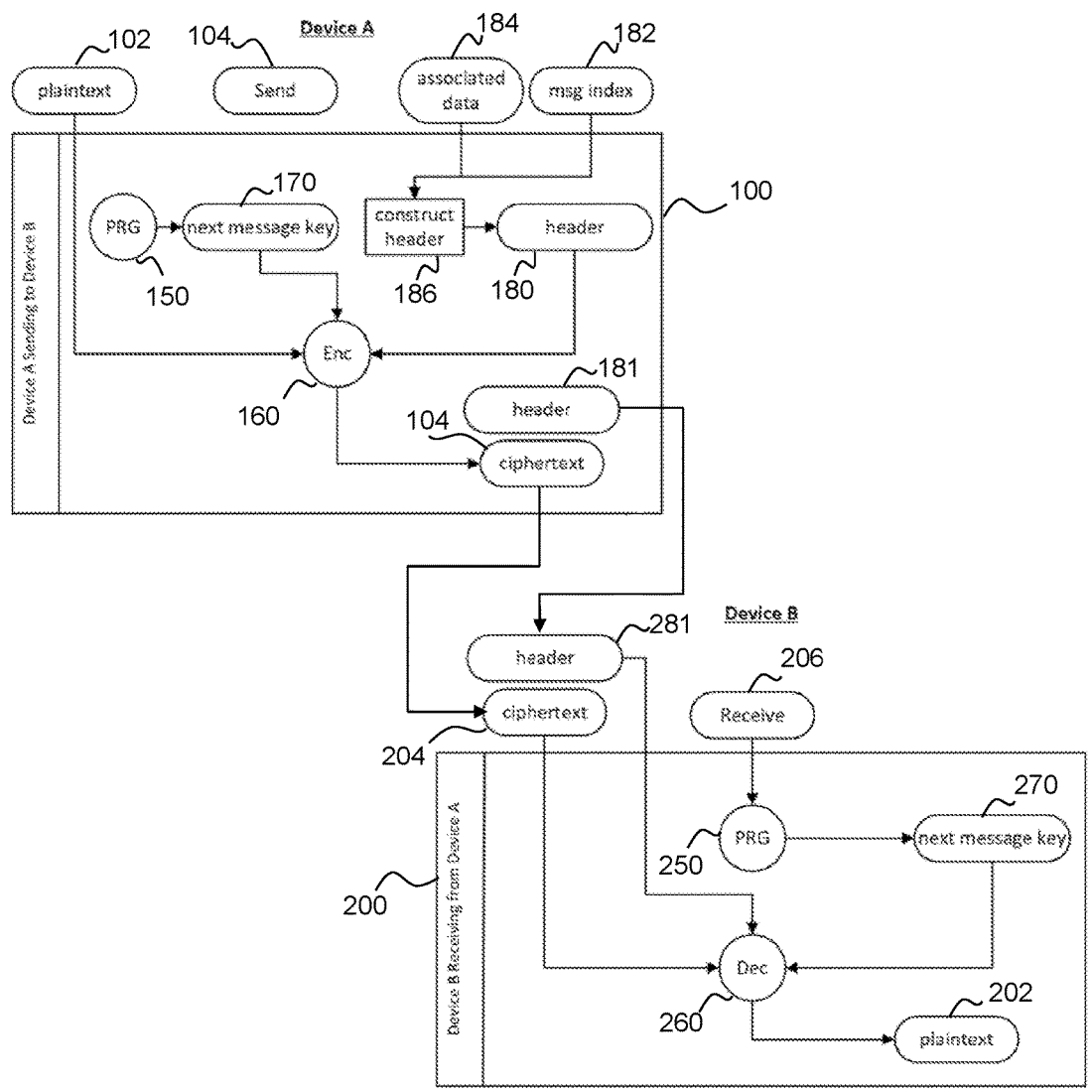
FIG. 15 is a flow diagram illustrating example functional blocks, data structures, and method steps for sending messages from a first device to a second device where each message includes a header according to aspects of the present invention.

FIG. 15 is a flow diagram illustrating, at a high level, example method steps that can be performed to send messages 102 from Alice (Device A) 100 to a Bob (Device B) 200 where each message 102 includes a header 180. Device A 100 can generate a message index 182 or other designator that indicates the location of a message key 170 in a sequence of keys generated within an epoch and other data 184 associated with the Device 100, epoch, message 102, conversation, etc.

The associated data 184 can consist of one or more fields, including but not limited to an epoch counter, information about previous messages and/or transactions, and other variables related to the messaging session. These fields can be added to a header structure 180 and then be provided as an input to an FS-AEAD 160 on the sending device 100 along with a plaintext message 102, and the sending device 100 can thereby produce as an output to its FS-AEAD 160, a ciphertext 104 representing both the header 180 and the plaintext message 102. This ciphertext 104, along with the header in plaintext 181, can then be sent from the sending device 100 and received by an intended receiving device 200. The intended receiving device 200 can provide the received ciphertext 204 and the received plaintext header 281 into its FS-AEAD 260. With both the header 281 in plaintext and the ciphertext 204 representing the header 180 and the plaintext message 102, the receiving device 200 can utilize the FS-AEAD algorithm 260 to detect if the ciphertext 204 and/or header in plaintext 281 has been tampered with. If the decrypted ciphertext 204 does not agree with the associated plaintext header 281, the FS-AEAD algorithm 260 on the receiving device can provide an indication of the disagreement, and the device 200 can respond by providing an indication that the ciphertext 204 is compromised and/or fail the decryption.

Figure 16:
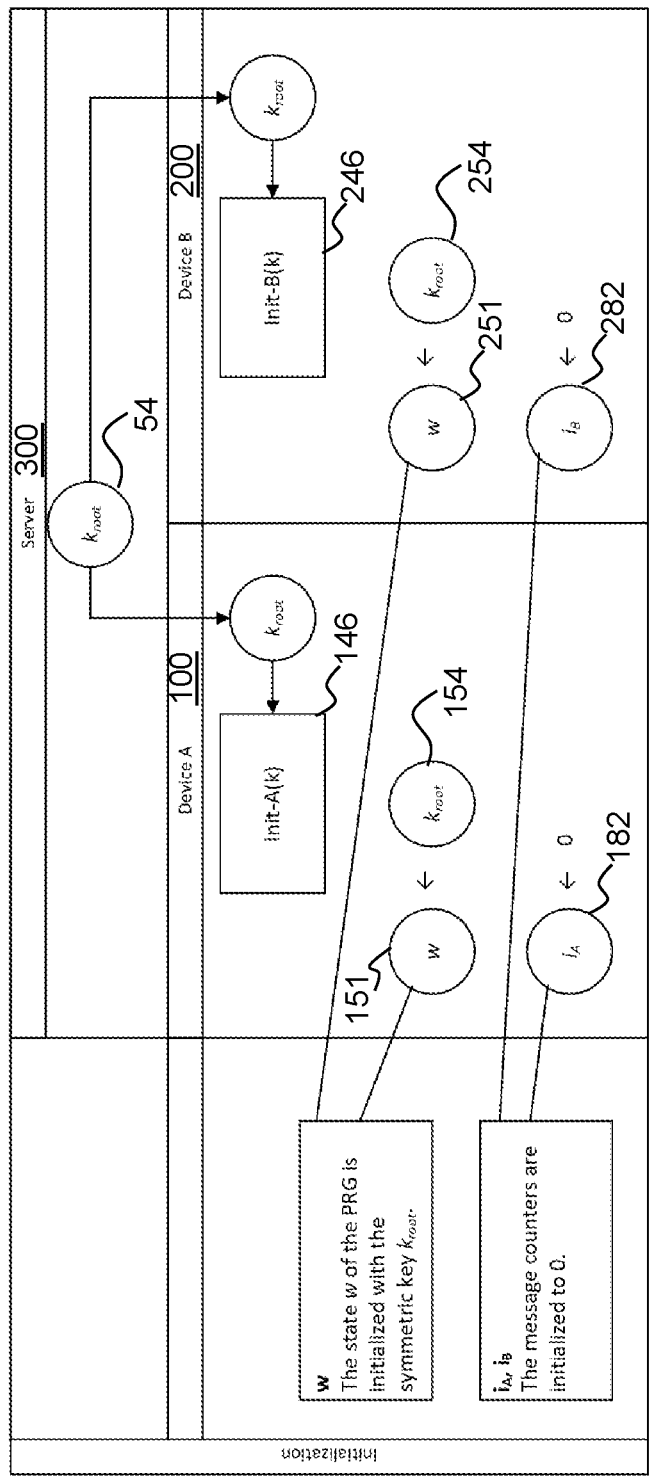
FIG. 16 is a flow diagram illustrating example functional blocks, data structures, and method steps that can be used to initialize a PRG and an index for counting messages in an epoch according to aspects of the present invention.

FIG. 16 is a flow diagram illustrating example functional blocks, data structures, and method steps that can be used to initialize a PRG and an index for counting messages in an epoch. When starting a conversation, a symmetric initialization key 54 can be transmitted from a server 300 to Device A 100 and Device B 200. Respective initialization keys 154, 254 received by each device 100, 200 can be provided as input to respective initialization functions 146, 246 to generate a root state 151, 251 on each device 100, 200. A message counter or message index 281, 282 can be initialized on each device 100, 200 to correspond with the beginning of a conversation or epoch.

Figure 17:
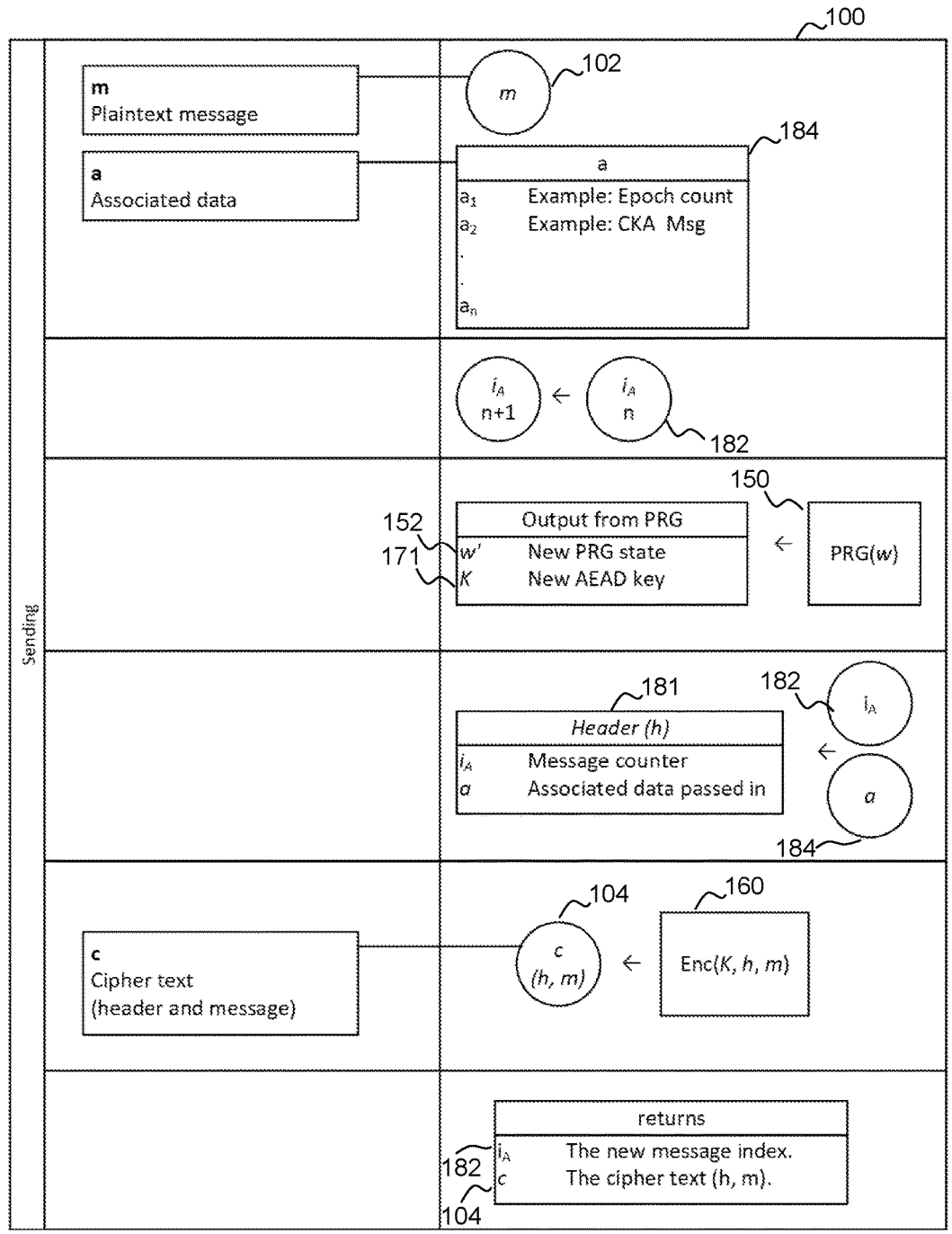
FIG. 17 is a flow diagram illustrating example functional blocks, data structures, and method steps for sending a message that includes a header from the perspective of a sending device according to aspects of the present invention.

FIG. 17 is a flow diagram illustrating example functional blocks, data structures, and method steps for sending a message that includes a header by a sending device 100. When sending, Device A 100 can select a plaintext message m 102 for encryption and sending with the associated data structure a 184. This step can increment a message counter i 182 by one. A PRG can receive a current stream cipher state w as input to produce a new AEAD key K, message key 171 and a new stream cipher state w' 152 replacing w. Index I 182 can be added to the header h 180 with associated data a 184. The message m 102 can be encrypted using the newly produced message key K 171 and appended with an unencrypted header h 181 to produce the ciphertext 104.

Figure 18:
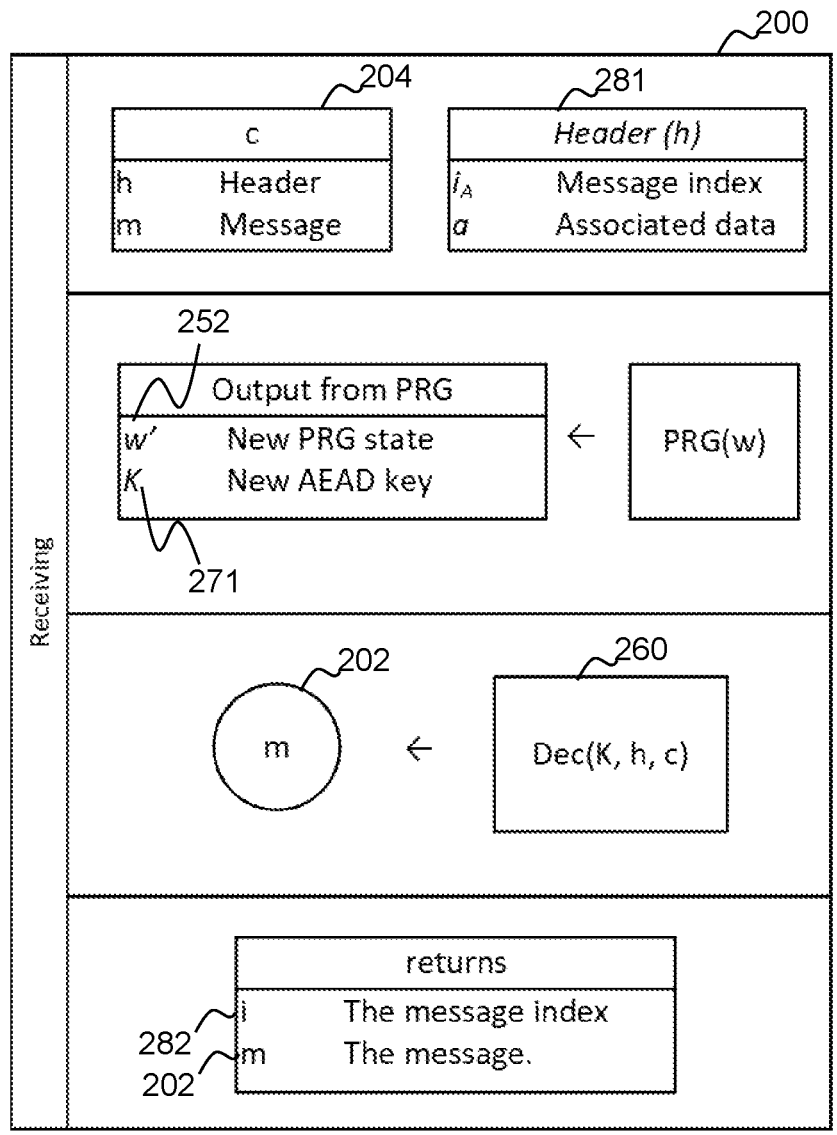
FIG. 18 is a flow diagram illustrating example functional blocks, data structure, and method steps for receiving a message that includes a header from the perspective of a receiving device according to aspects of the present invention.

FIG. 18 is a flow diagram illustrating example functional blocks, data structure, and method steps for receiving a message that includes a header by a receiving device 200. When receiving, Device B acting as a receiving device 200 can accept a ciphertext c 204 and the header h 281 (which is in plaintext) as input. Simultaneously, Device B 200 can use a stream cipher state w to produce the new AEAD key K 271 and to establish a new stream cipher state w' 252. The ciphertext c 204 can be decrypted using key K 271 and header h 281 information to recover the message m 202.

The header 281 can be sent as plaintext to confirm that the ciphertext 204 was not tampered with, a header 180 (see FIG. 15) can also have been having been originally bound to the ciphertext 104 during the authenticated encryption operation 160 and the header 180 could have been passed in with the plaintext message 102 to produce a single ciphertext output 104. Alternatively, just the message 102 could have been passed into the authenticated encryption 160 operation to produce both the ciphertext output 102 and a tag to be sent to the receiver 200 to confirm that the ciphertext 202 was not tampered with.

Figure 19:
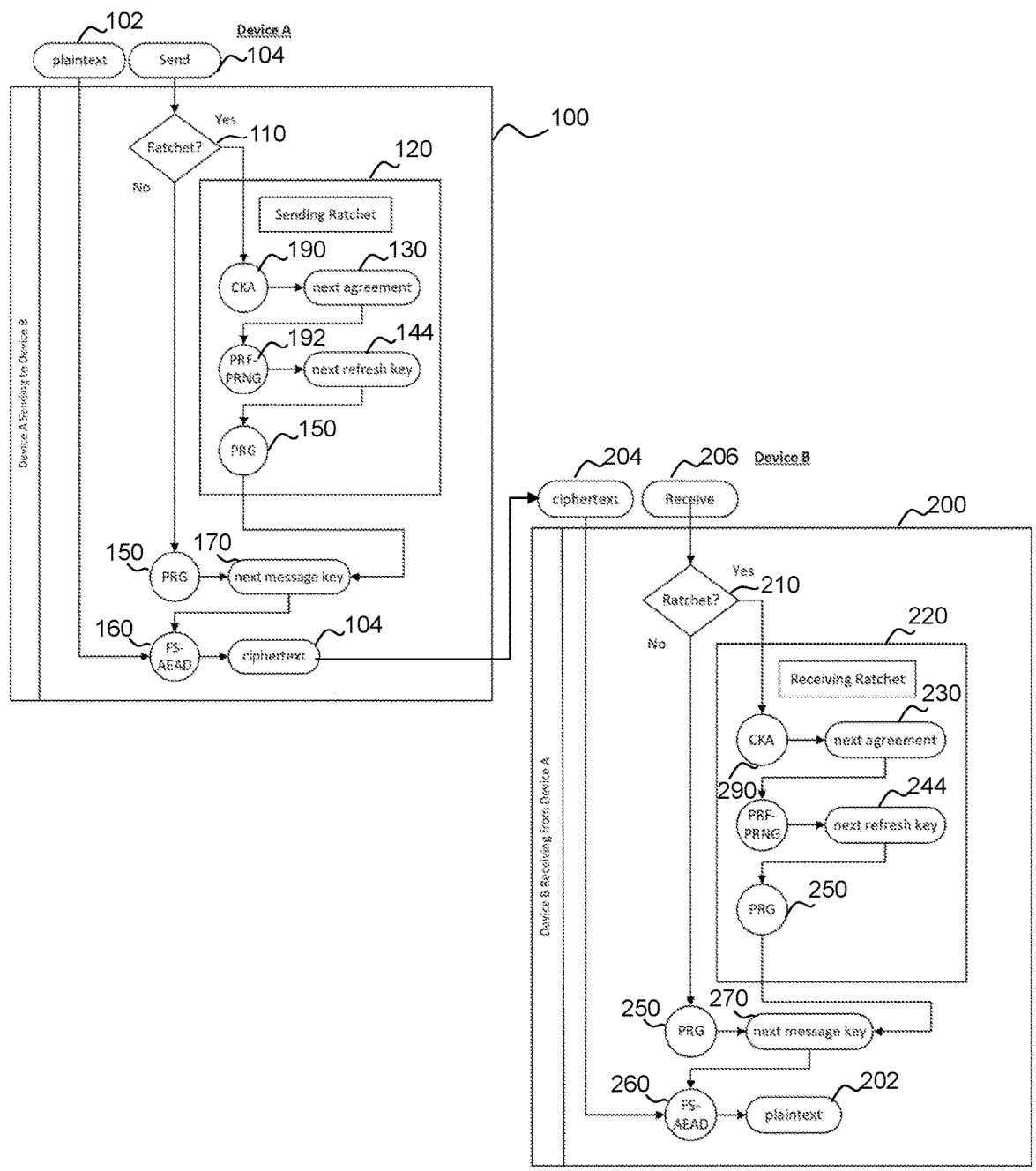
FIG. 19 is a flow diagram illustrating example functional blocks, data structures, and method steps for performing a ratchet according to aspects of the present invention.

FIG. 19 is a flow diagram illustrating example functional blocks, data structure, and method steps of a system wherein Alice's device, Device A 100, can perform a sending ratchet 120 upon receiving a send command 104 at the beginning of an epoch, and Bob's device, Device B 200, can perform a receiving ratchet upon receiving a ciphertext 204 at the beginning of the epoch. The flow diagram illustrated in FIG. 19 can follow a process as described in relation to FIG. 1. In the QMP, individual ratchet steps can be restricted to an "as needed" basis, meaning, keys are not generated until they are needed. This can prevent the premature storage and leakage of information about the keys in the event of a temporary or permanent device compromise. As needed key generation as illustrated in FIG. 19 is contrasted with implementations where independent ratchets are combined into a single step, even when not required, such as is illustrated in FIG. 20.

Figure 20:
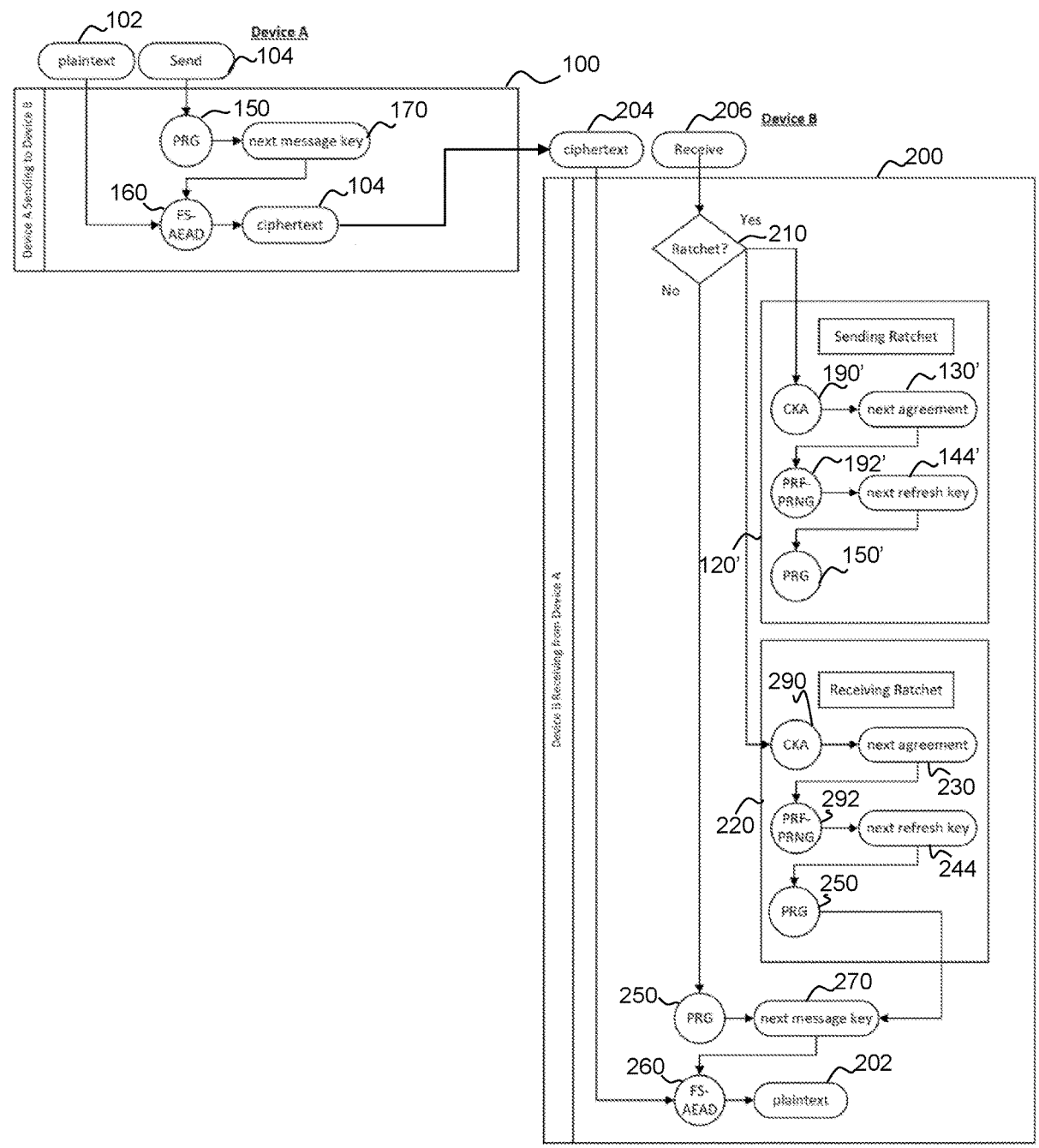
FIG. 20 is a flow diagram illustrating example functional blocks, data structures, and method steps for performing a ratchet according to aspects of the present invention.

FIG. 20 is a flow diagram illustrating example functional blocks, data structure, and method steps for performing a sending ratchet and a receiving ratchet as an alternative to as described in relation to FIGS. 1 and 19 wherein Bob's device, Device B 200, upon receiving a ciphertext 204 at the beginning of an epoch, can perform both a receiving ratchet 220 and a sending ratchet 120'. The receiving ratchet 220 can generate a message key 170 for decrypting the ciphertext 204, and the sending ratchet 120' can generate a refresh key 144' for refreshing the PRG 150' at the end of the present epoch for encrypting messages in the subsequent epoch when Device B sends to Alice. The sending ratchet 120' can establish a symmetric key 130' based on a CKA 190' for a sending device. The symmetric key 130' can be provided to a PRF-PRNG 192' to generate the refresh key 144'. A PRG 150' can be initialized with the refresh key 144'.

Figure 21:
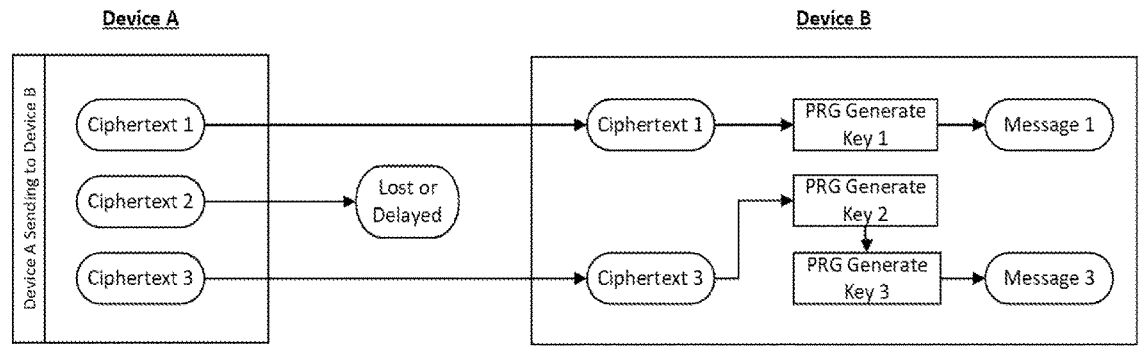
FIG. 21 is a flow diagram illustrating message recovery according to aspects of the present invention.

FIG. 21 is a flow diagram illustrating message loss resilience. In some examples, each message within an epoch can include a header with a message index that can be used by a receiving device to correctly calculate a message key even when messages are received out of order or lost altogether. An individual message key for a correct epoch can be calculated to decrypt a message and verify the header was unmodified. The payload that includes Ciphertext 3 can also include a message index i set to 3 and associated data. Device B can correctly order the messages to advance the message key generator to the correct decryption key and immediately decrypt the message.

Figure 22A:
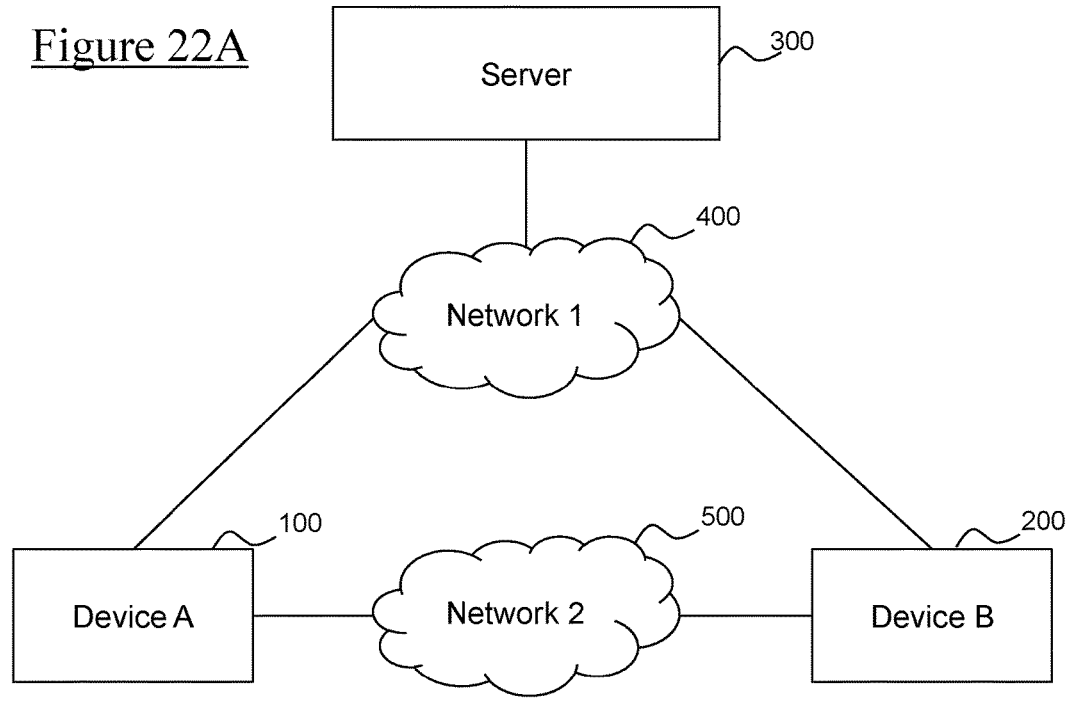
FIGS. 22A, 22B, and 22C are illustrations of example system environments that can be used to facilitate certain aspects of the present invention.
Figure 22B:
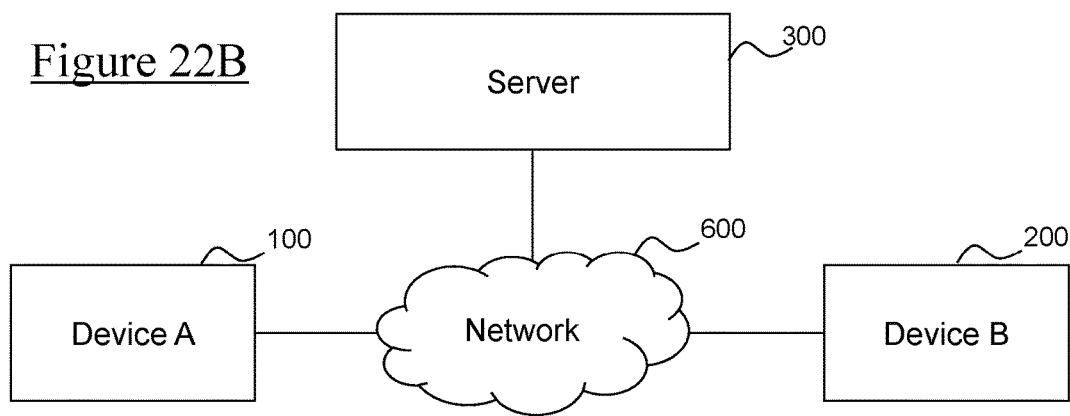
Figure 22C:
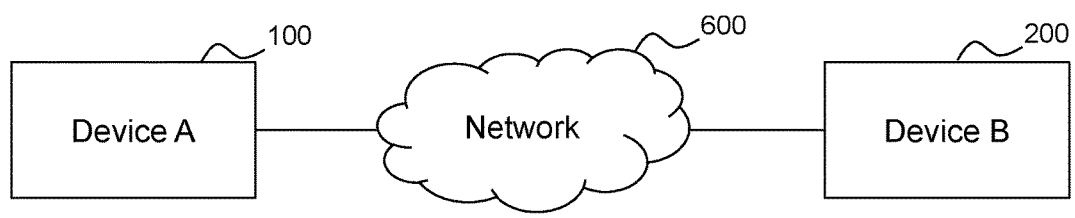

FIGS. 22A, 22B, and 22C are illustrations of example system environments that can be used to initialize each communication device and/or facilitate communication between each communication device. As described herein, in some examples, communication devices 100, 200 can communicate with each other and with a server 300. The server 300 can provide keys and/or data to the devices 100, 200 to establish initial key agreement and/or to maintain key agreement between the devices 100, 200.

Each communication device 100, 200 can be an electronic device capable of sending and receiving messages over a network. Examples of a communication device 100, 200 can include a mobile device, smart phone, general purpose computer, tablet computer, laptop computer, telephone, PSTN landline, smart wearable device, voice command device, other mobile computing device, sensor or monitoring device, or other device adapted to send and receive data over a network.

Each communication device 100, 200 can include a processor, storage medium, and/or additional electronics for generating keys, generating states, encrypting, and decrypting as described herein and as otherwise known to a person of ordinary skill in the art. Functional blocks, functions, data structures, and algorithms described herein can be implemented in hardware and/or software as would be understood by a person of ordinary skill in the art. Each communication device 100, 200 can include computer readable medium with instructions thereon, that when executed by a processor perform methods, functions, and algorithms described herein. Messages can be generated on each communication device 100, 200 and/or be provided to each device 100, 200. Each communication device 100, 200 can include and/or be in communication with a user interface for inputting messages, a port for receiving messages from an external device, a sensor, or other message generator.

The server 300 can be an electronic device capable of generating and/or receiving cryptographic keys and transmitting said keys over a network. The server 300 can include a processor, storage medium, and/or additional electronics for generating and/or receiving keys and/or states. The server 300 can include a transmitter for transmitting keys. The server 300 can include a transceiver for facilitating communications between the devices 100, 200 through the server 300 and/or receiving data from each device 100, 200.

As illustrated in FIG. 22A, communications from individual devices 100, 200 to the server 300 can be transmitted through a first network 400, and communications between devices 100, 200 can be transmitted through a second network 500. The first and second networks can be separate, such that some or all communication channels on the first network 400 are isolated from some or all the communication channels on the second network 500. In some examples, the first network 400 can be a secure network, and the second network 500 can be an unsecure network; initial key agreements (e.g. see FIGS. 5, 10, 13, and 16) can be provided from the server 300 through the first network 400 over one or more secure channels; and subsequent transmissions between the devices 100, 200 can occur over one or more unsecure channels in the second network 500.

As illustrated in FIG. 22B, as an alternative to the system illustrated in FIG. 22A, the server 300 and the devices 100, 200 can communicate with each other through a common network 600. The common network 600 can be an unsecure network, and all transmissions, including initial key agreements can be transmitted through the common network 600.

As illustrated in FIG. 22C, as an alternative to the systems illustrated in FIGS. 22A and 22B, communication devices 100, 200 can communicate over a network 600 absent a communication link to a server. In some examples, as an alternative to having initial key agreements distributed over a network by a server (e.g. see FIGS. 5, 10, 13, and 16), the initial key agreements can be previously stored on each device, the initial key agreements can be generated on a first device 100 and transmitted to a second device 200, or some combination thereof. For example, each device can have stored thereon an initial state or root key for initializing a PRG. Device B 200, acting as a first receiving device, can generate a first asymmetric key pair using a key generation function and transmit the public key of the first asymmetric key pair to Device A to initialize a conversation and indicate that it is ready to receive.

The descriptions contained herein are examples of embodiments of the invention and are not intended in any way to limit the scope of the invention. As described herein, the invention contemplates many variations and modifications of the systems, methods and devices described herein, including alternative software modules to perform functions described herein, alternative data structures, alternative key agreement algorithms, alternative key generation algorithms, etc. These modifications would be apparent to those having ordinary skill in the art to which this invention relates and are intended to be within the scope of the claims which follow.

The invention claimed is:

1. A method of exchanging messages between devices, the method comprising:
providing a first communication device;
providing a second communication device;
providing a first asymmetric key pair comprising a first public key and a first private key;
providing a root state;
storing the first public key on the first device;
storing the first private key on the second device;
storing the root state on the first device and the second device;
generating, on the first device, a first epoch key and a second asymmetric key pair comprising a second private key and a second public key,
wherein the first epoch key is generated based at least in part on the first public key;
transmitting, from the first device, the first epoch key and the second public key;
receiving, by the second device, the first epoch key and the second public key;
generating, independently on each of the first device and the second device, a first refresh key, wherein the first refresh key is generated on the first device based at least in part on the first public key and the root state, wherein the first refresh key is generated on the first device without requiring a private key corresponding to the first epoch key, and wherein the first refresh key is generated on the second device based at least in part on the first private key, the first epoch key, and the root state;

generating, independently on each of the first device and the second device, a first state, wherein, the first state is generated on the first device based at least in part on the first public key and the root state, wherein the first state is generated on the first device without requiring a private key corresponding to the first epoch key, and wherein, the first state is generated on the second device based at least in part on the first private key, the first epoch key, and the root state;

generating, independently on the first device and the second device, a first message key, wherein, on each of the first device and the second device, the first message key is generated based at least in part on the first state and the first refresh key;

encrypting a first message, on the first device, with the first message key;

receiving, by the second device, the encrypted first message; and decrypting the encrypted first message, on the second device, with the first message key.

2. The method of claim 1 further comprising:

generating, independently on the first device and the second device, a second message key, wherein, on each of the first device and the second device, the second message key is generated based at least in part on the first state and the first message key;

encrypting a second message, on the first device, with the second message key;

transmitting, from the first device, the encrypted second message;

receiving, by the second device, the encrypted second message; and decrypting the encrypted second message, on the second device, with the second message key.

3. The method of claim 1 further comprising:

generating, on the second device, a second epoch key and a third asymmetric key pair comprising a third private key and a third public key, wherein the second epoch key is generated based at least in part on the second public key;

transmitting, from the second device, the second epoch key and the third public key;

receiving, by the first device, the second epoch key and the third public key;

generating, independently on each of the first device and the second device, a second refresh key, wherein the second refresh key is generated on the second device based at least in part on the second public key and the first state, and wherein the second refresh key is generated on the first device based at least in part on the second private key, the second epoch key, and the first state; and generating, independently on each of the first device and the second device, a second state, wherein, the second state is generated on the second device based at least in part on the second public key and the first state, and wherein, the second state is generated on the first device based at least in part on the second private key, the second epoch key, and the first state.

4. The method of claim 3 further comprising:

deleting the first message key, on the second device, before performing the step of transmitting, from the second device, the second epoch key and the third public key.

5. The method of claim 1 further comprising:

generating, on the first device, a first message index associated with the first message key and a first epoch index associated with the first state;

generating, on the first device, a first header comprising the first message index and the first epoch index;

generating, on the first device, a first ciphertext comprising the header and the first encrypted message; and transmitting, from the first device, the first ciphertext.

6. The method of claim 5 further comprising:

receiving, by the second device, the first ciphertext; and verifying the first message key, by the second device, based on the first message index and the first epoch index.

7. The method of claim 1 further comprising:

generating, on the first device, a first header comprising the first epoch key and the second public key;

generating, on the first device, a first ciphertext comprising the header and the first encrypted message; and transmitting, from the first device, the first ciphertext.

8. The method of claim 1 wherein the step of providing a root state further comprises:

receiving a root key at each of the first device and the second device; and generating, independently on each of the first device and the second device, the root state by providing the root key to a respective pseudo-random function and generating the root state as an output of each respective pseudo-random function.

9. The method of claim 1 further comprising:

generating, independently on each of the first device and the second device, a first shared key, wherein the first shared key is generated on the first device based at least in part on the first public key, wherein the first shared key is generated on the second device based at least in part on the first private key and the first epoch key, wherein the first refresh key is generated on each of the first device and the second device based on the first shared key and the root state, and wherein the first state is generated on each of the first device and the second device based on the first shared key and the root state.

10. The method of claim 9 further comprising:

providing as inputs to a pseudo-random function, the shared key and the root state;

generating as outputs from the pseudo-random function, the first state and the first refresh key.

11. The method of claim 2 further comprising:

initializing a random number generator with the first state;

providing the first refresh key as an input to the random number generator;

generating, as an output from the random number generator, the first message key;

providing the first message key as an input to the random number generator; and generating, as an output from the random number generator, the second message key.

12. The method of claim 2, further comprising:
initializing a random number generator with the first state;
providing the first refresh key as an input to the random number generator initialized in the first state;
generating, as an output from the random number generator initialized in the first state and provided the first refresh key, the first message key;
initializing the random number generator with a second state;
generating, as an output from the random number generator initialized in the second state, the second message key.

13. A method of exchanging messages between devices, the method comprising:
providing a first communication device;
providing a second communication device;
providing a first asymmetric key pair comprising a first public key and a first private key;
providing a pseudo-random generator;
storing the first public key on the first device;
storing the first private key on the second device;
storing the pseudo-random number generator on both the first device and the second device;
generating, on the first device, a first epoch key and a second asymmetric key pair comprising a second private key and a second public key,
wherein the first epoch key is generated based at least in part on the first public key;
transmitting, from the first device, the first epoch key and the second public key;
receiving, by the second device, the first epoch key and the second public key;
generating, independently on each of the first device and the second device, a first message key,
wherein the first message key is generated on the first device based at least in part on the first public key,
wherein the first message key is generated on the first device without requiring a private key corresponding to the first epoch key, and
wherein the first message key is generated on the second device based at least in part on the first private key and the first epoch key;
generating, independently on each of the first device and the second device, a second message key, by providing the first message key as an input to the pseudo-random number generator and providing the second message key as an output of the pseudo-random number generator as a result of providing the first message key;
encrypting, on the first device, a first message with the first message key and a second message with the second message key;
transmitting, from the first device, a first epoch comprising the encrypted first message and the encrypted second message;
receiving, by the second device, the first epoch;
decrypting, on the second device, the encrypted first message with the first message key and the second encrypted message with the second message key;
generating, on the second device, a second epoch key and a third asymmetric key pair comprising a third private key and a third public key,
wherein the second epoch key is generated based at least in part on the second public key;
transmitting, from the second device, the second epoch key and the third public key;

receiving, by the first device, the second epoch key and the third public key;
generating, independently on each of the first device and the second device, a third message key,
wherein the third message key is generated on the second device based at least in part on the second public key,
wherein the third message key is generated on the second device without requiring a private key corresponding to the second epoch key, and
wherein the third message key is generated on the first device based at least in part on the second private key and the second epoch key;
encrypting, on the second device, a third message with the third message key;
transmitting, from the second device, a second epoch comprising the encrypted third message; and
deleting, from the second device, the first message key and the second message key prior to the step of transmitting, from the second device, the second epoch comprising the encrypted third message.

14. The method of claim 13 further comprising:
transmitting a plurality of epochs, each epoch comprising one or more encrypted messages,
wherein the one or more encrypted messages in an epoch of the plurality of epochs is transmitted from only one of the first device and the second device, and
wherein the plurality of epochs are transmitted in an alternating fashion such that an epoch transmitted from the second device is followed by an epoch that is transmitted by the first device, which is followed by another epoch transmitted from the second device.

15. The method of claim 13 further comprising:
generating, on the first device, a first header;
generating, on the first device, a first ciphertext comprising the first header and the first encrypted message;
appending, on the first device, the first header in plaintext to the first ciphertext; and
transmitting, from the first device, the first ciphertext and the first header in plaintext.

16. The method of claim 15 further comprising:
receiving, by the second device, the first ciphertext and the first header in plaintext; and
authenticating the ciphertext, by the second device, based on the first header in plaintext.

17. The method of claim 16 further comprising:
generating, on the first device, a message index,
wherein the step of generating, on the first device the first header further comprises generating the first header to comprise the message index, and
wherein the step of authenticating the ciphertext, by the second device, based on the first header in plaintext further comprises generating an $n^{th}$ message key based on the message index.

18. The method of claim 13 further comprising:
providing a root state at each of the first device and the second device;
initializing the pseudo-random number generator on each of the first device and the second device based on the root state;
generating an updated state based on the root state at each of the first device and the second device; and
reinitializing the pseudo-random number generator on each of the first device and the second device based on the updated state.

19. The method of claim 13 further comprising:
providing a root state at each of the first device and the second device;
generating, independently on each of the first device and the second device, a first shared key; and
generating, independently on each of the first device and the second device, a first state,
  wherein the first shared key is generated on the first device based at least in part on the first public key,
  wherein the first shared key is generated on the second device based at least in part on the first private key and the first epoch key; and
generating, independently on each of the first device and the second device, a first refresh key,
  wherein the first refresh key is generated on each of the first device and the second device based on the shared key and the root state, and
  wherein the first state is generated on each of the first device and the second device based on the first shared key and the root state,
  wherein the step of generating, independently on each of the first device and the second device, a first message key, further comprises:
    initializing the pseudo-random number generator on each of the first device and the second device with the first state,
    providing the first refresh key as an input to the initialized pseudo-random number generator, and
    generating the first message key by the pseudo-random number generator on each of the first device and the second device based at least in part on the first refresh key.

* * * * *